(12) United States Patent
Hiller et al.

(10) Patent No.: US 11,245,223 B2
(45) Date of Patent: Feb. 8, 2022

(54) CLOSING DEVICE WITH ELECTRICAL CONTACT

(71) Applicant: Fidlock GmbH, Hannover (DE)

(72) Inventors: Lasse Hiller, Hannover (DE); Artur Siebert, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 35 days.

(21) Appl. No.: 16/630,760

(22) PCT Filed: Jul. 6, 2018

(86) PCT No.: PCT/EP2018/068438
§ 371 (c)(1),
(2) Date: Jan. 13, 2020

(87) PCT Pub. No.: WO2019/011819
PCT Pub. Date: Jan. 17, 2019

(65) Prior Publication Data
US 2020/0235520 A1    Jul. 23, 2020

(30) Foreign Application Priority Data
Jul. 14, 2017 (DE) ..................... 10 2017 212 149.1

(51) Int. Cl.
*F16B 1/00* (2006.01)
*H01R 13/62* (2006.01)
(Continued)

(52) U.S. Cl.
CPC ............ *H01R 13/6205* (2013.01); *B62J 6/04* (2013.01); *F16B 1/00* (2013.01); *H01R 13/6271* (2013.01); *F16B 2001/0035* (2013.01)

(58) Field of Classification Search
CPC .... H01R 13/6205; H01R 13/6271; B62J 6/04; F16B 1/00; F16B 2001/0035
See application file for complete search history.

(56) References Cited

U.S. PATENT DOCUMENTS 3,926,493 A * 12/1975 Wakabayashi ..... H01R 13/6205
439/39
5,909,100 A * 6/1999 Watanabe ............... H01F 38/14
320/108
(Continued)

FOREIGN PATENT DOCUMENTS

| CN | 1178402 A | 4/1998 |
|---|---|---|
| CN | 101515685 A | 8/2009 |

(Continued)

*Primary Examiner* — Tho D Ta
(74) *Attorney, Agent, or Firm* — The Webb Law Firm

(57) ABSTRACT

A closing device for releasably connecting two parts includes a first closing part which has a first engaging projection, and a second closing part which has a second engaging projections. The first closing part and the second closing part can be attached to each other in order to close the closing device and, in a closed position, are interconnected mechanically by the first engaging projection and the second engaging projection is in engagement with each other in a positive locking manner in the closed position. A magnetic device acting between the first closing part and the second closing part is designed to assist the attaching of the first closing part and the second closing part to each other by providing a magnetic attraction force. The first closing part has at least one first electrical contact element and the second closing part has at least one second electrical contact element.

16 Claims, 34 Drawing Sheets

(51) Int. Cl.
    *B62J 6/04*          (2020.01)
    *H01R 13/627*    (2006.01)

(56) References Cited

U.S. PATENT DOCUMENTS

| | | |
|---|---|---|
| 10,177,491 B2 | 1/2019 | Davies et al. |
| 2009/0215283 A1 | 8/2009 | Du |
| 2013/0143419 A1* | 6/2013 | Wei .................... H01R 13/6205 |
| | | 439/39 |
| 2015/0135486 A1 | 5/2015 | Fiedler et al. |
| 2016/0073744 A1 | 3/2016 | Fiedler et al. |

FOREIGN PATENT DOCUMENTS

| | | | |
|---|---|---|---|
| CN | 104853636 | A | 8/2015 |
| CN | 105228480 | A | 1/2016 |
| DE | 4312032 | C2 | 4/1997 |
| EP | 1220369 | A1 | 7/2002 |
| EP | 2955092 | A1 | 12/2015 |
| FR | 2638907 | A1 | 5/1990 |
| KR | 969916 | Y1 | 11/1996 |
| WO | 2008068241 | A1 | 6/2008 |
| WO | 2014090926 | A1 | 6/2014 |
| WO | 2016166538 | A1 | 10/2016 |

* cited by examiner

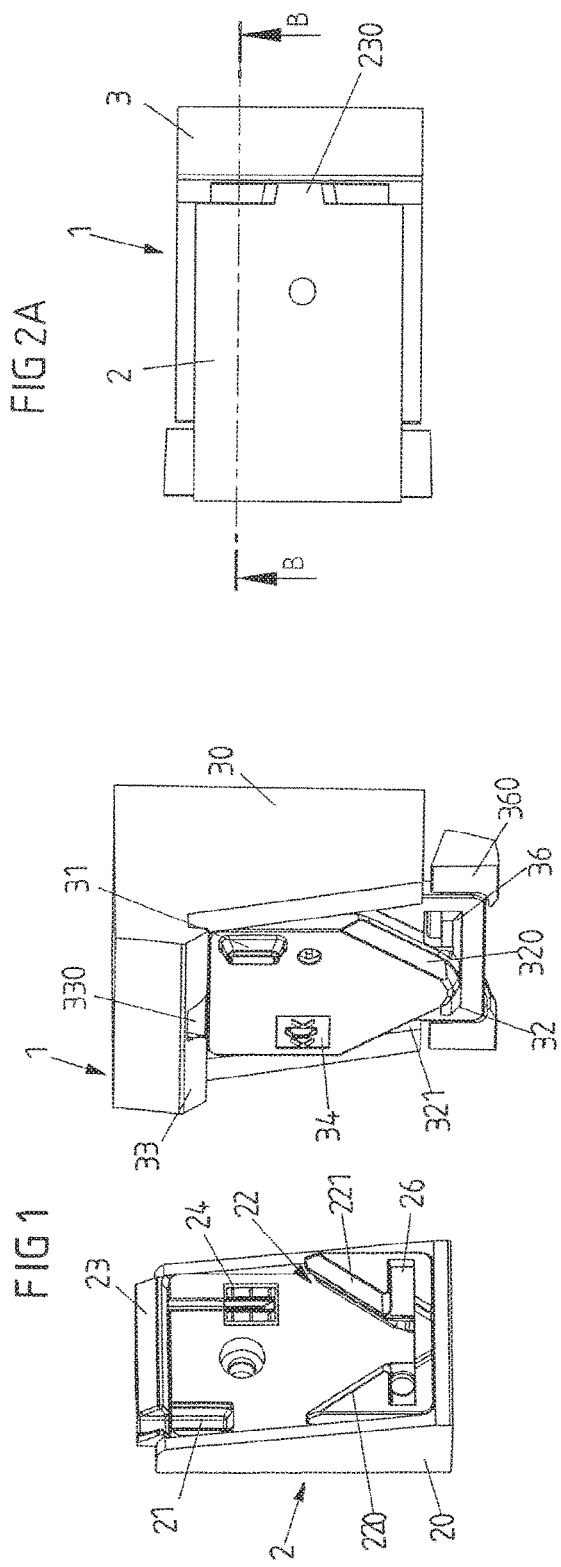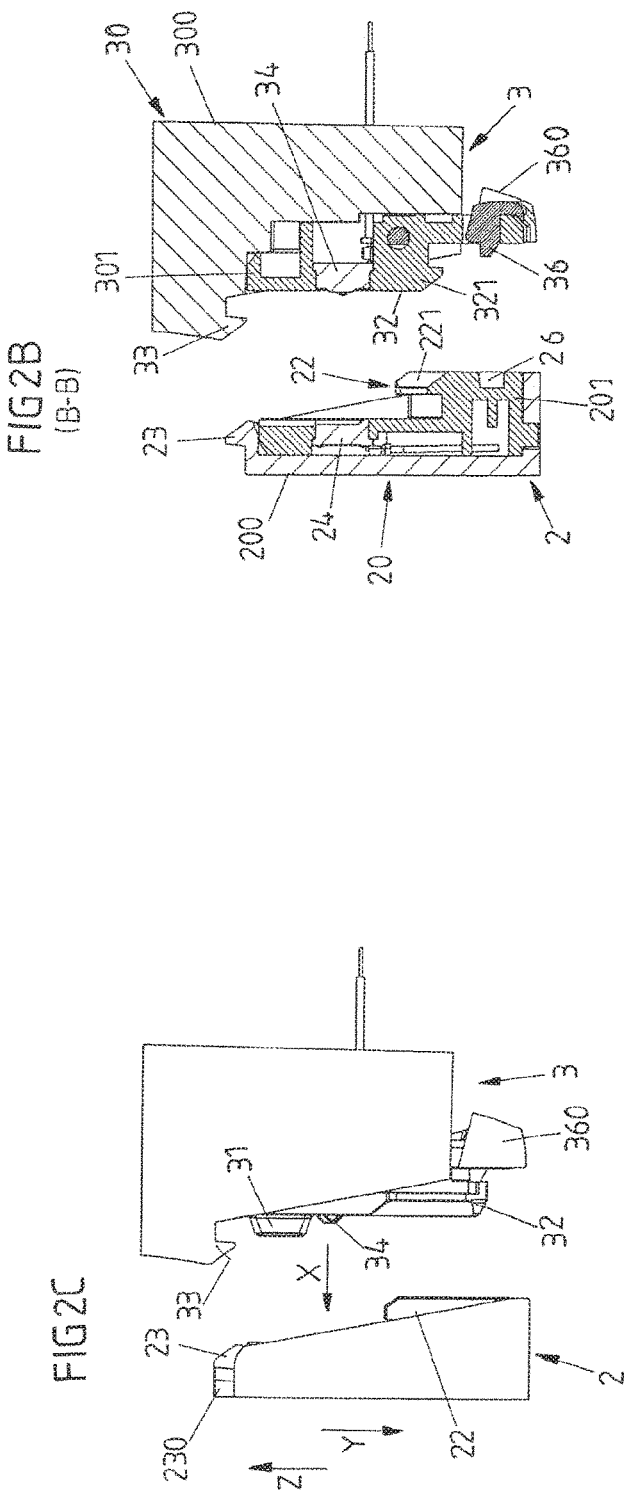

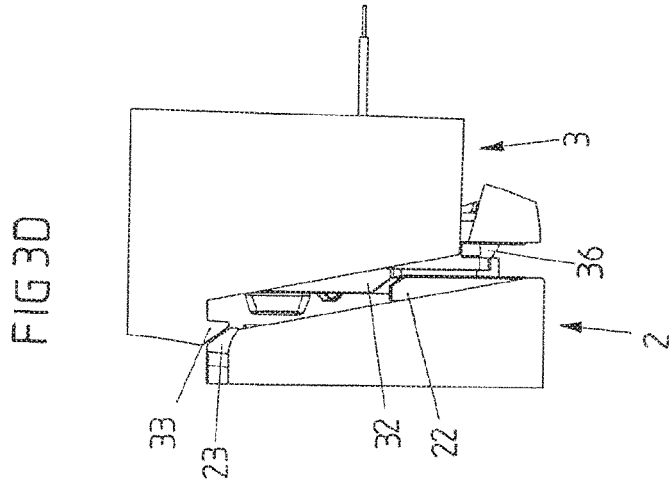
FIG 3D
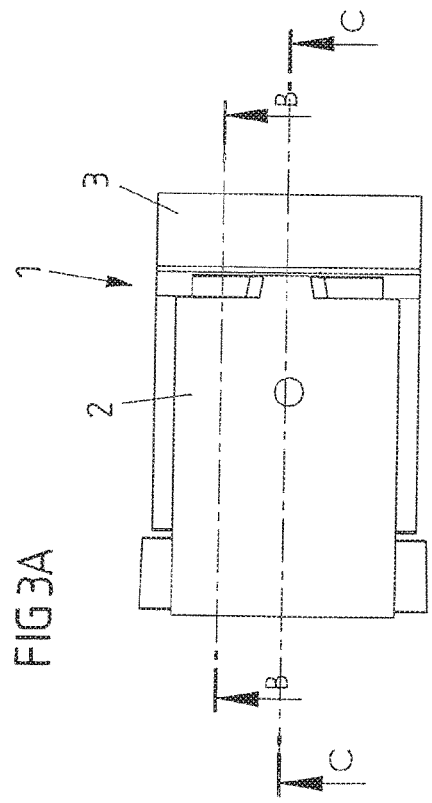
FIG 3A
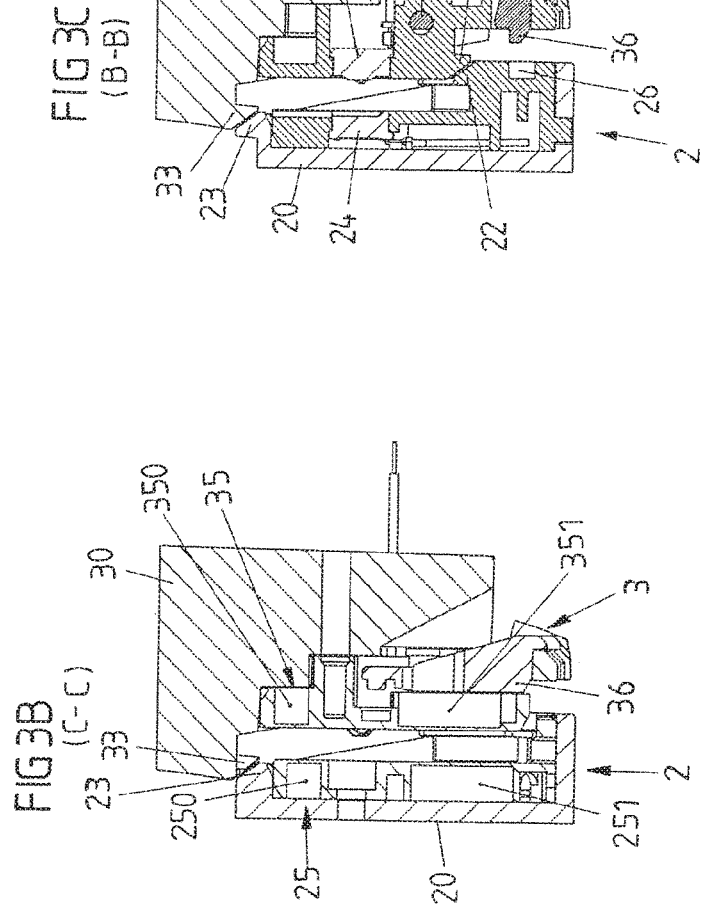
FIG 3C (B-B)
FIG 3B (C-C)

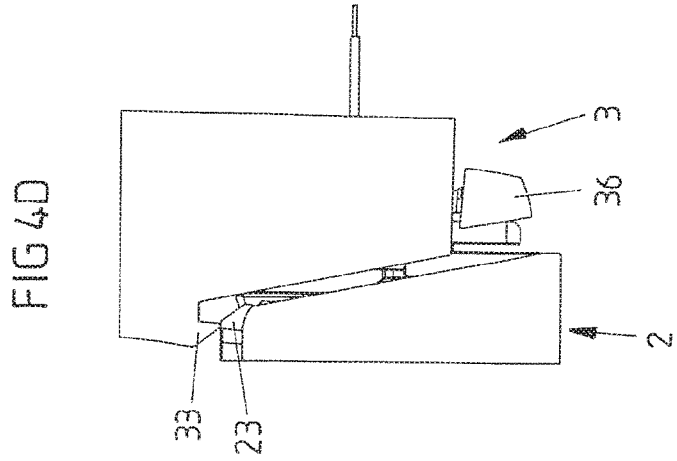
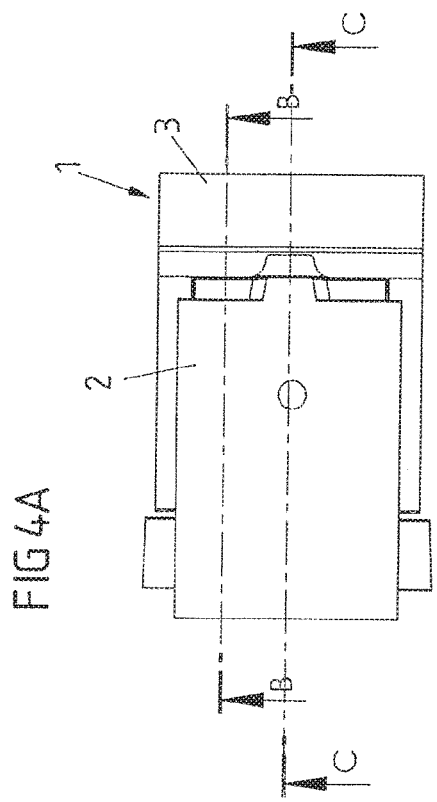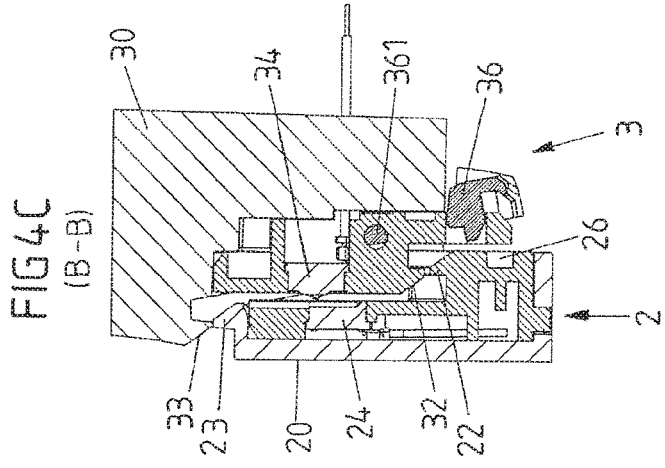
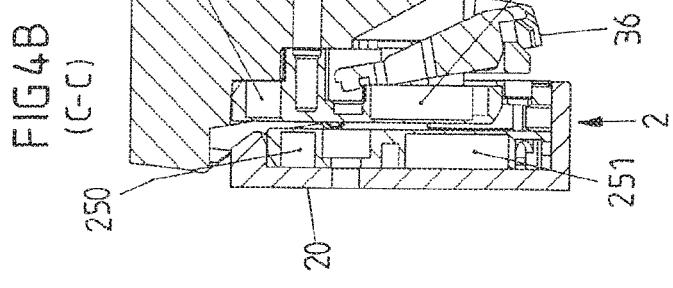

(B-B)

(C-C)

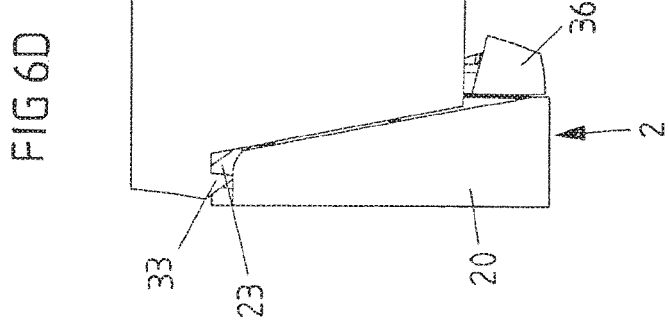
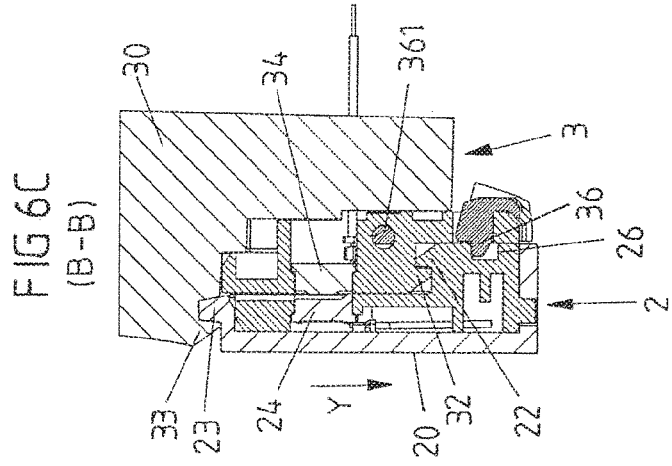
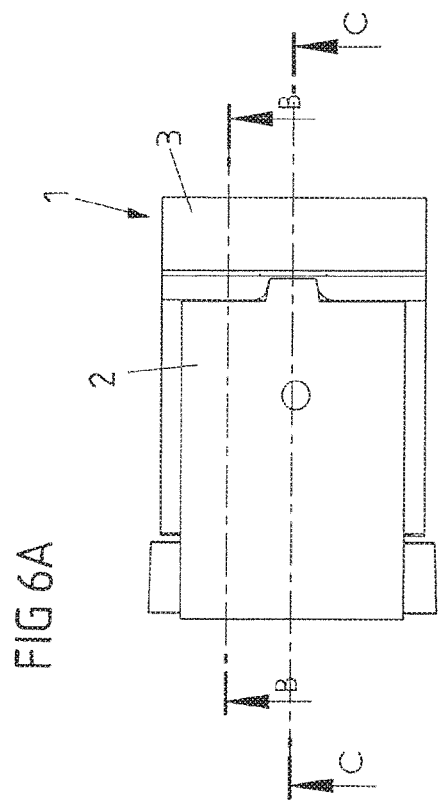
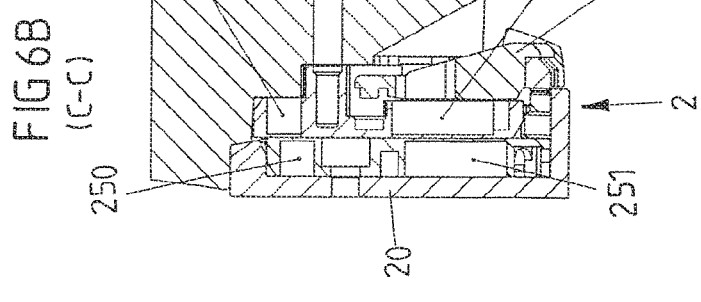

(C-C)

(B-B)

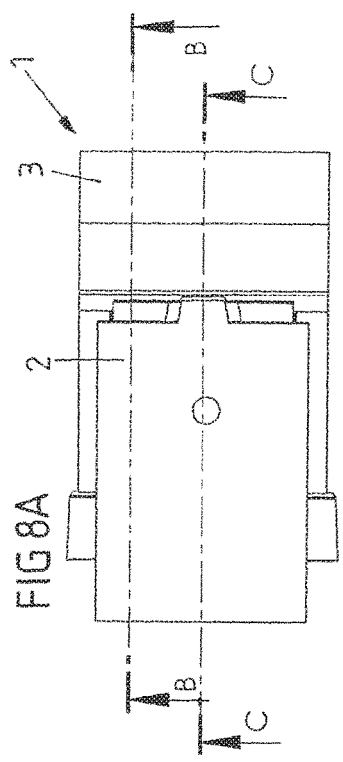
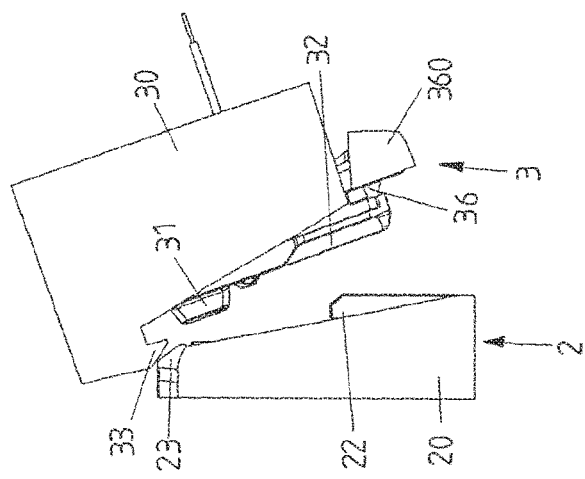
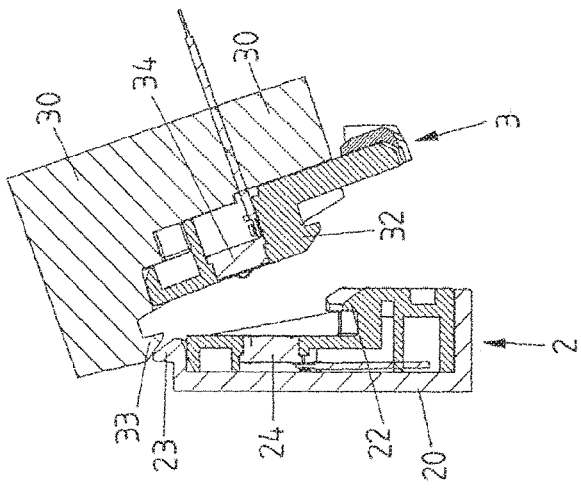
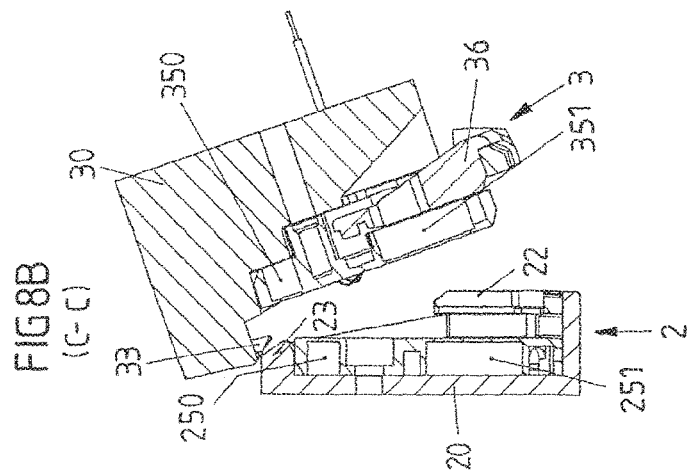

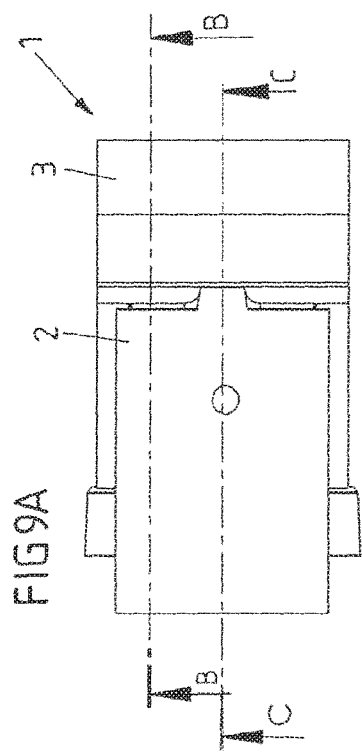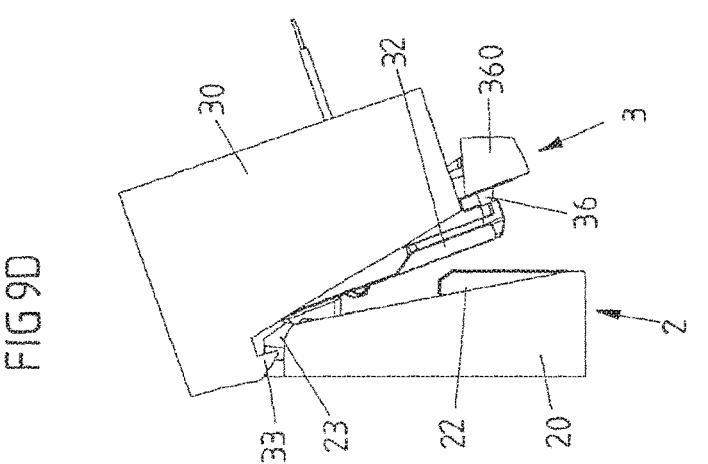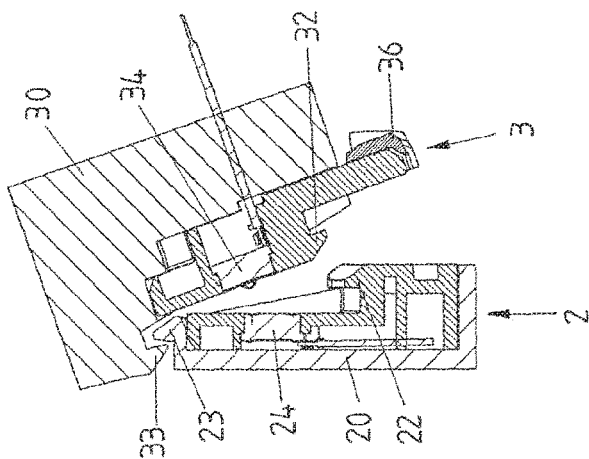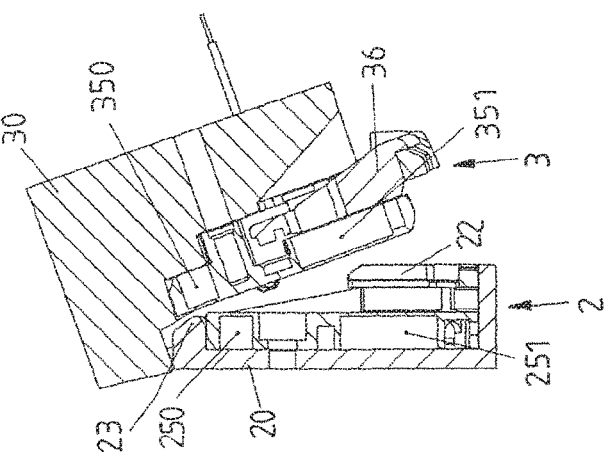

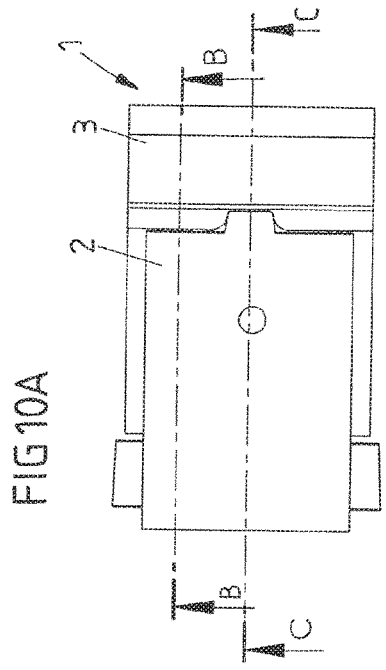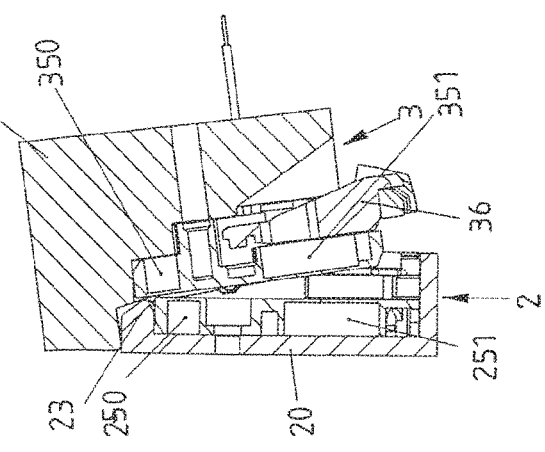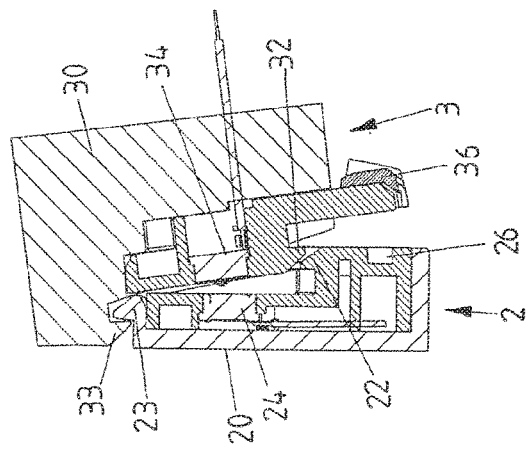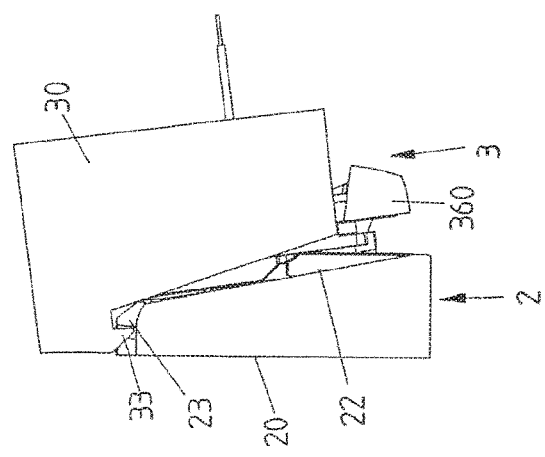

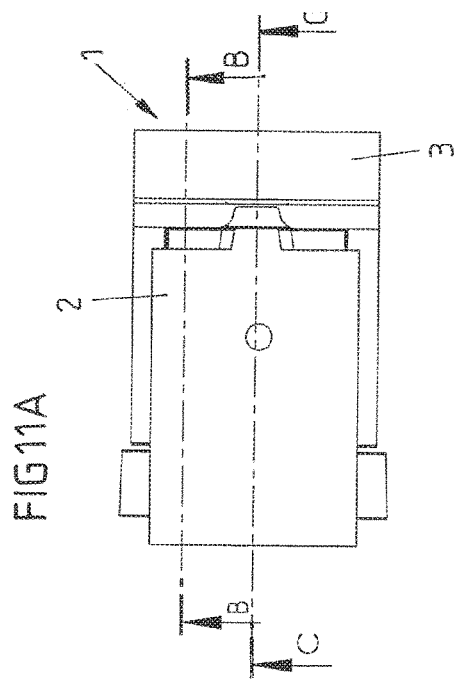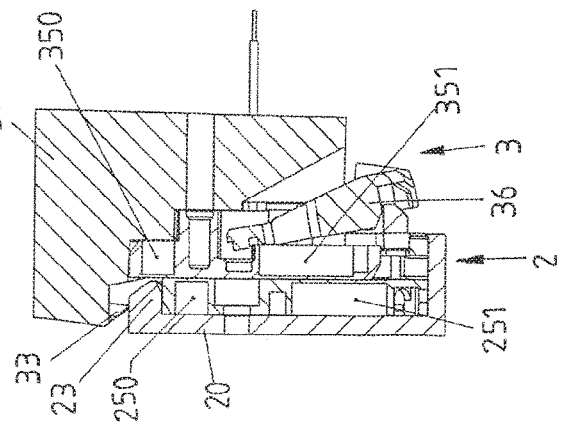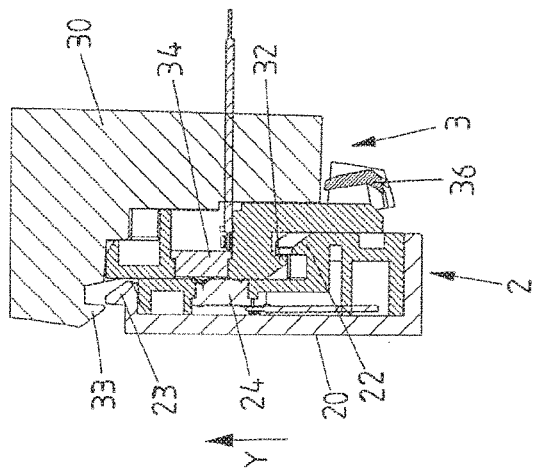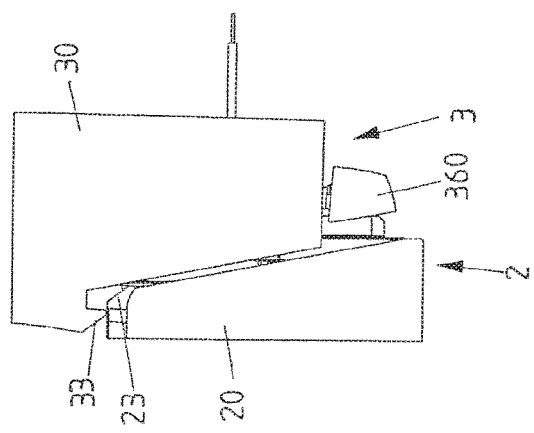

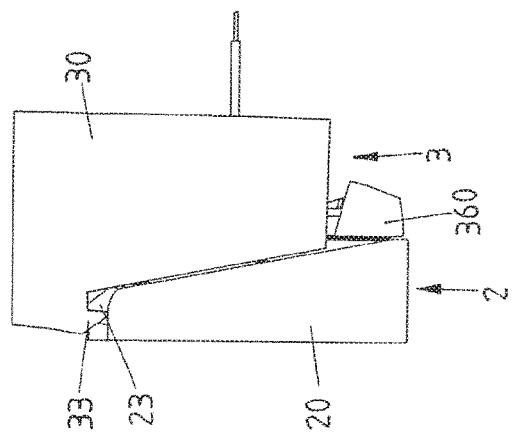
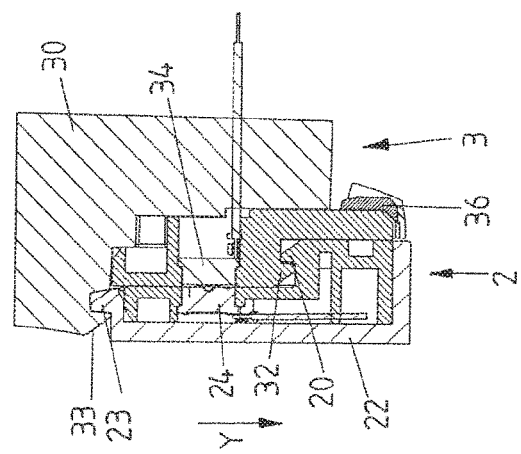
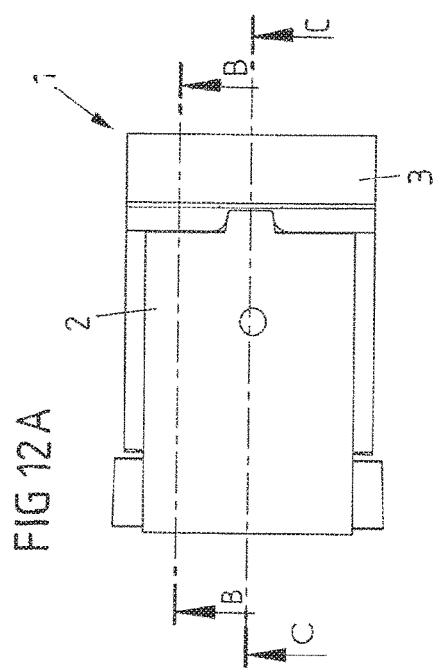
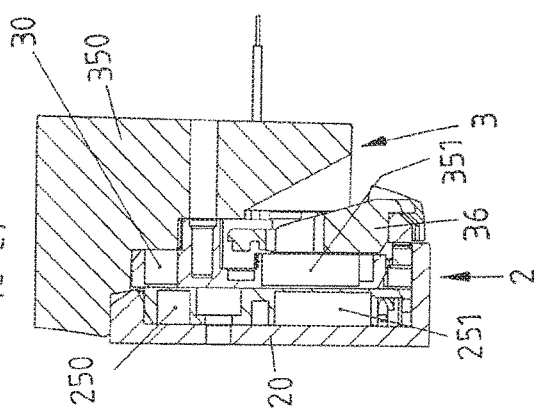

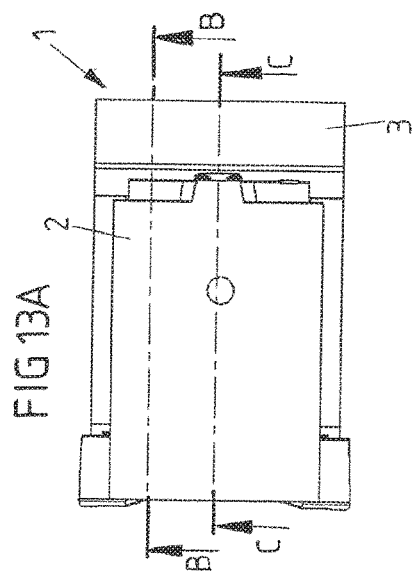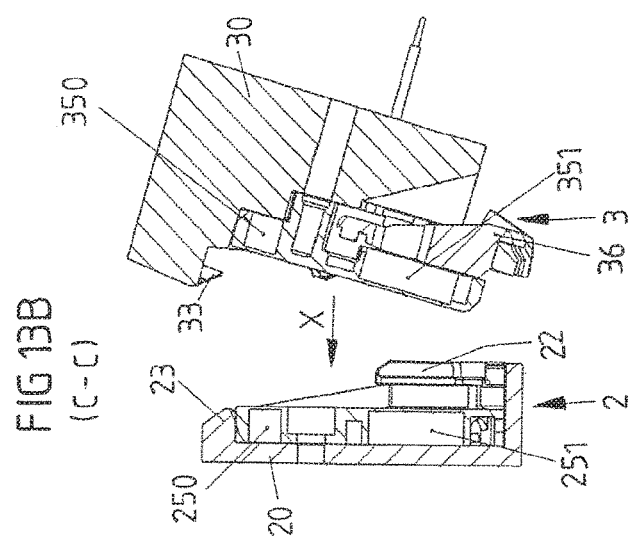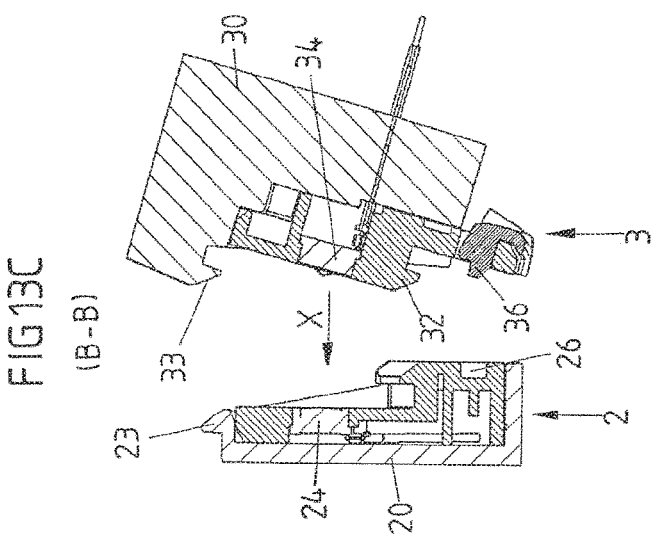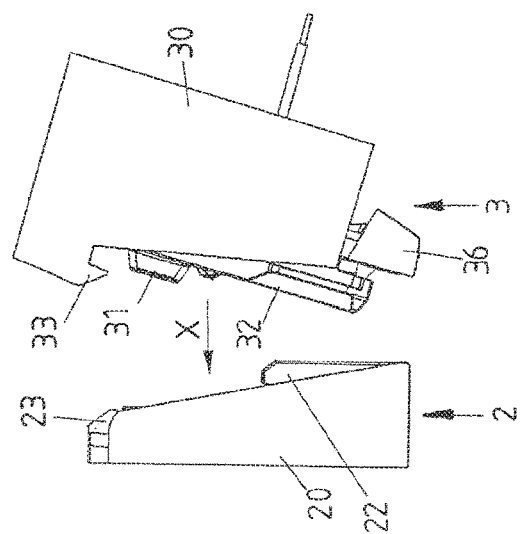

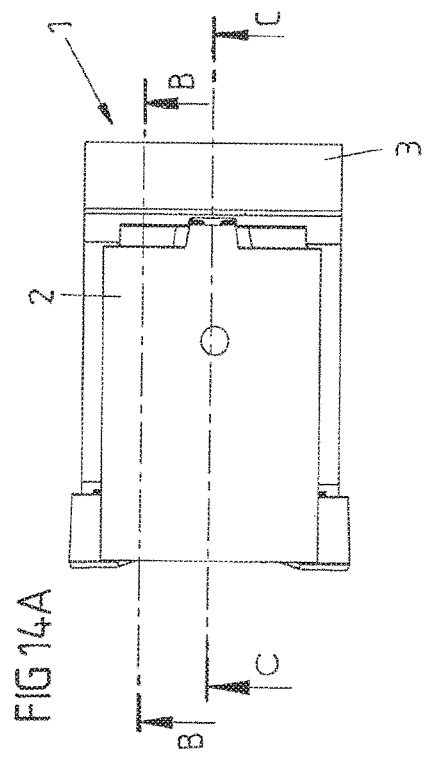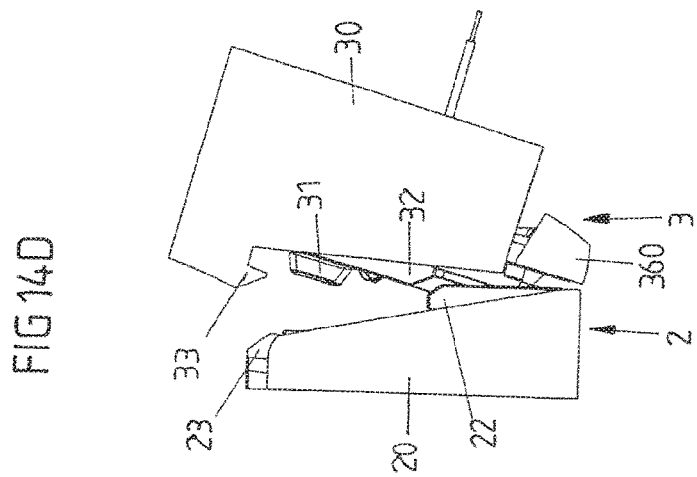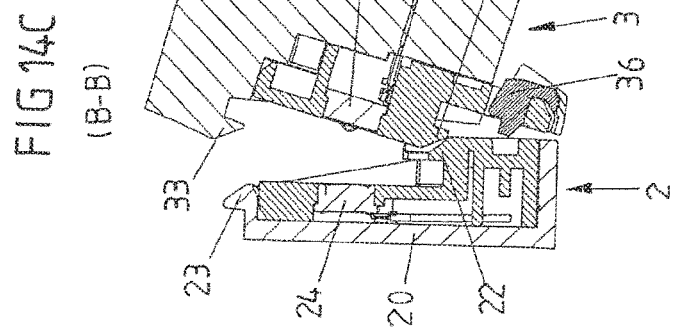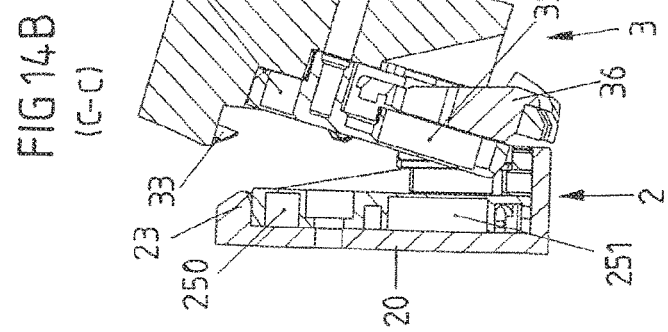

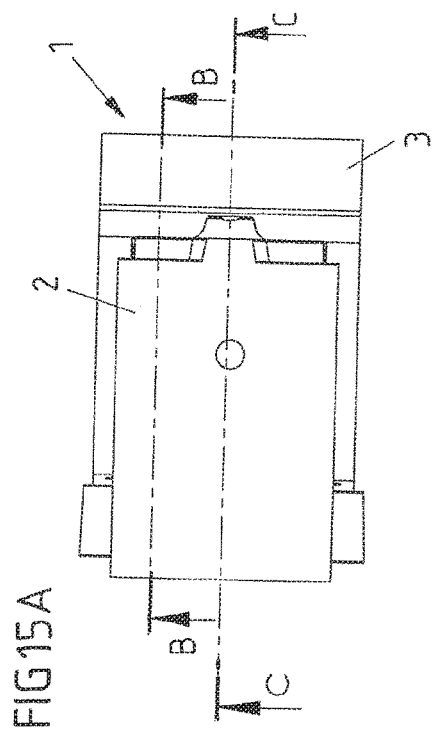
FIG 15A
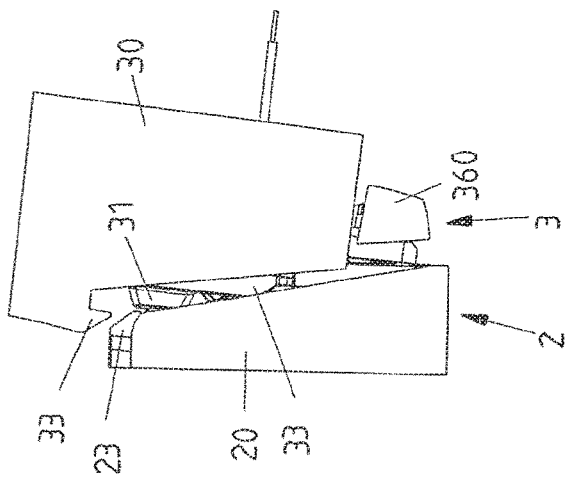
FIG 15D
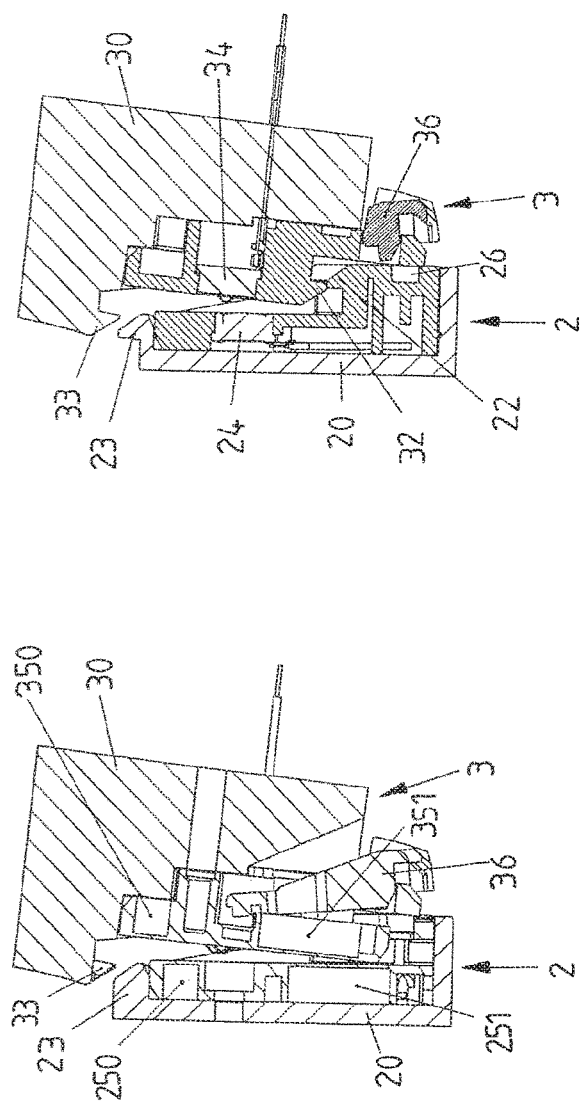
FIG 15C
(B-B)
FIG 15B
(C-C)

(B - B)

(C - C)

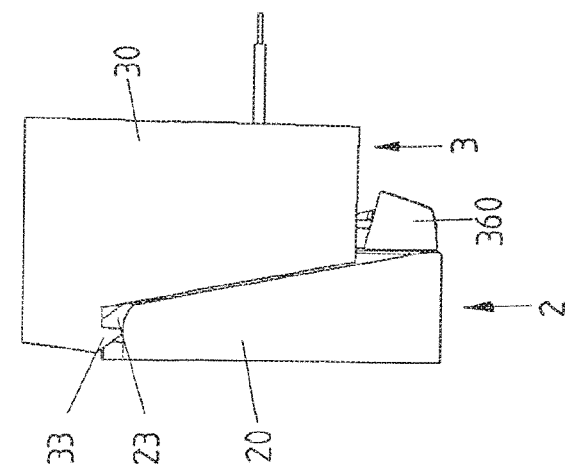
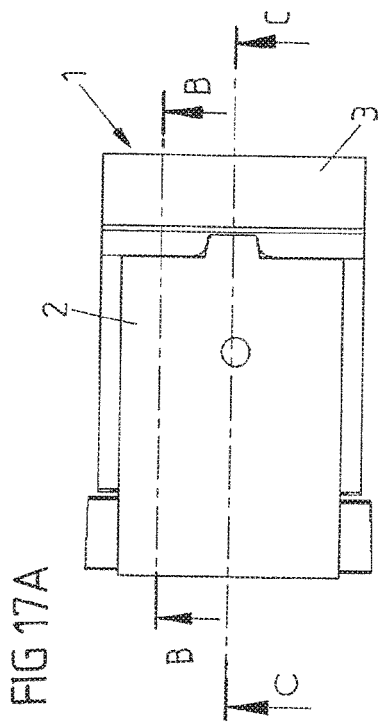
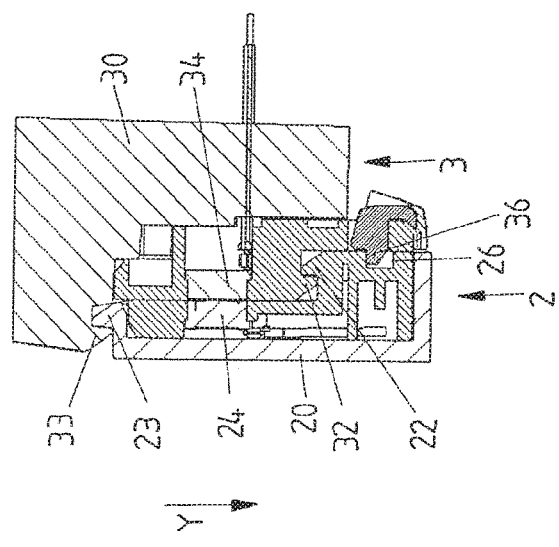
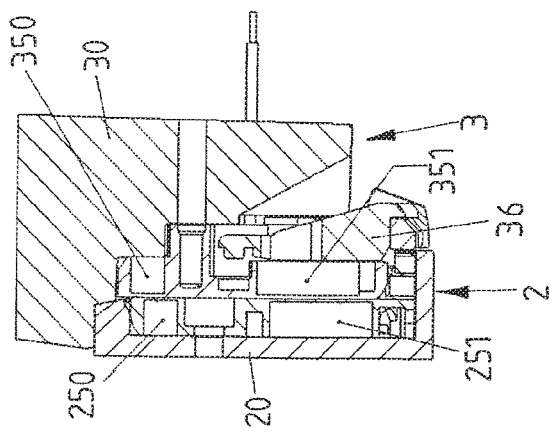

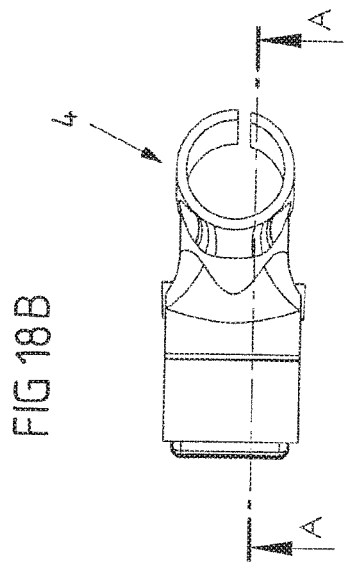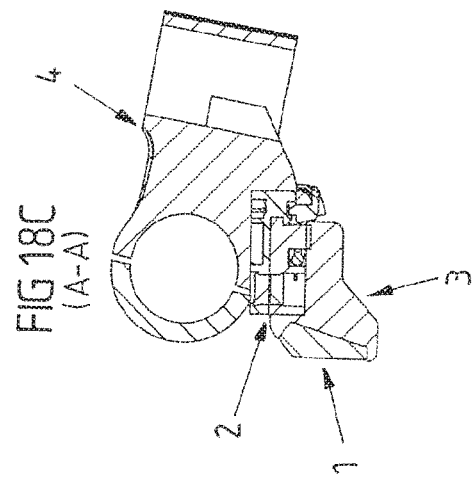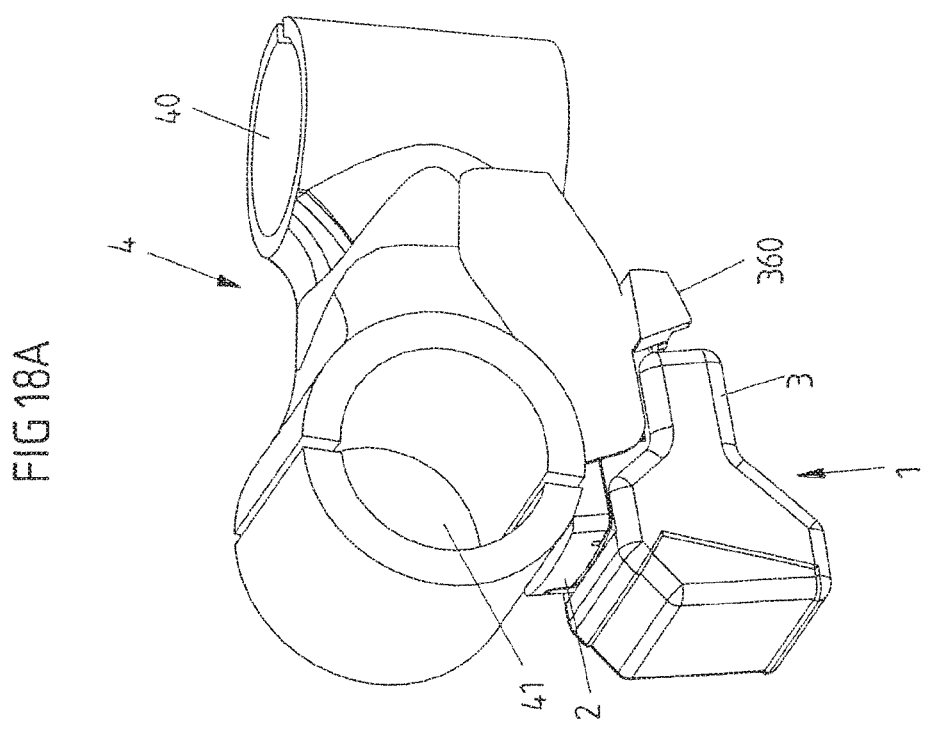

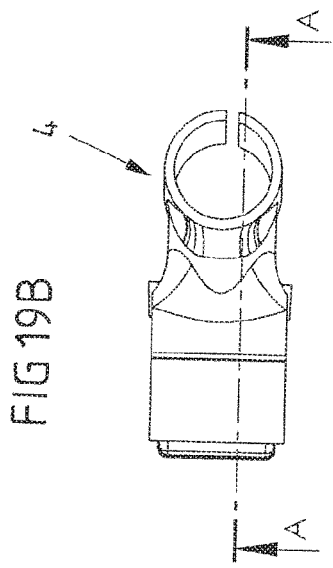
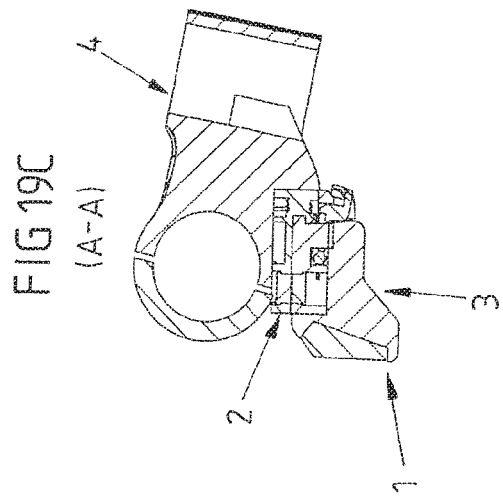
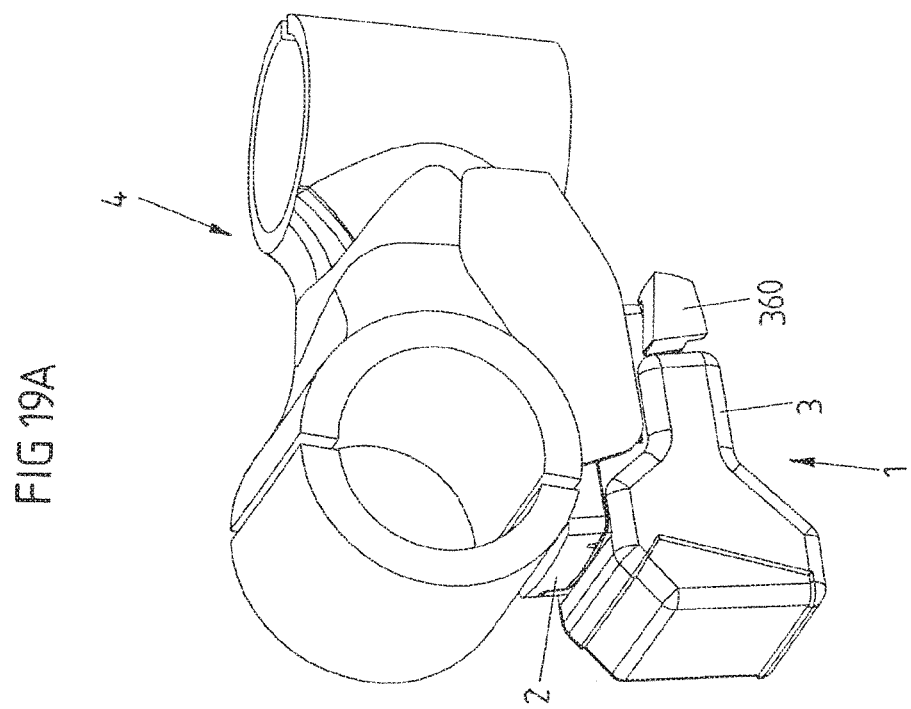

(A-A)

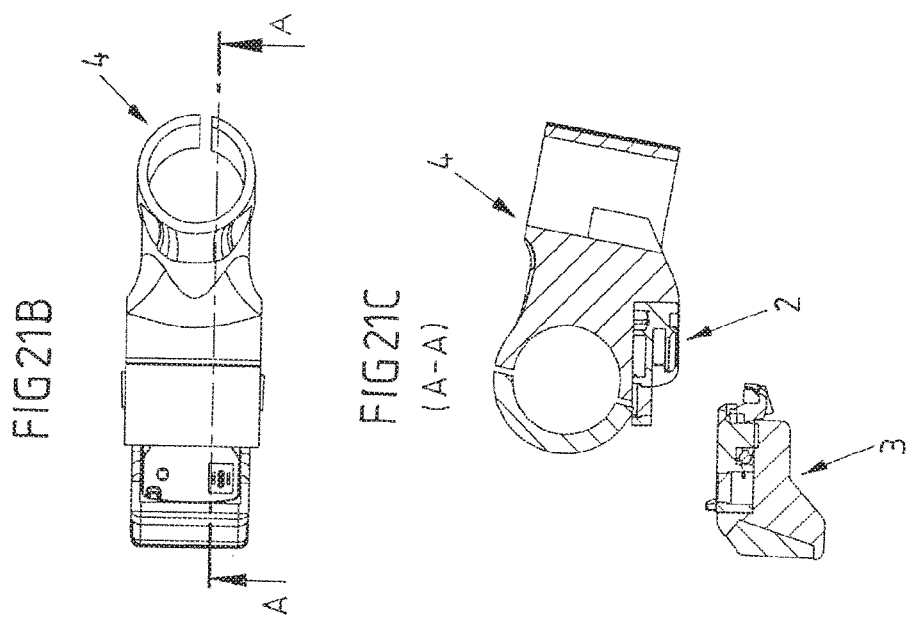
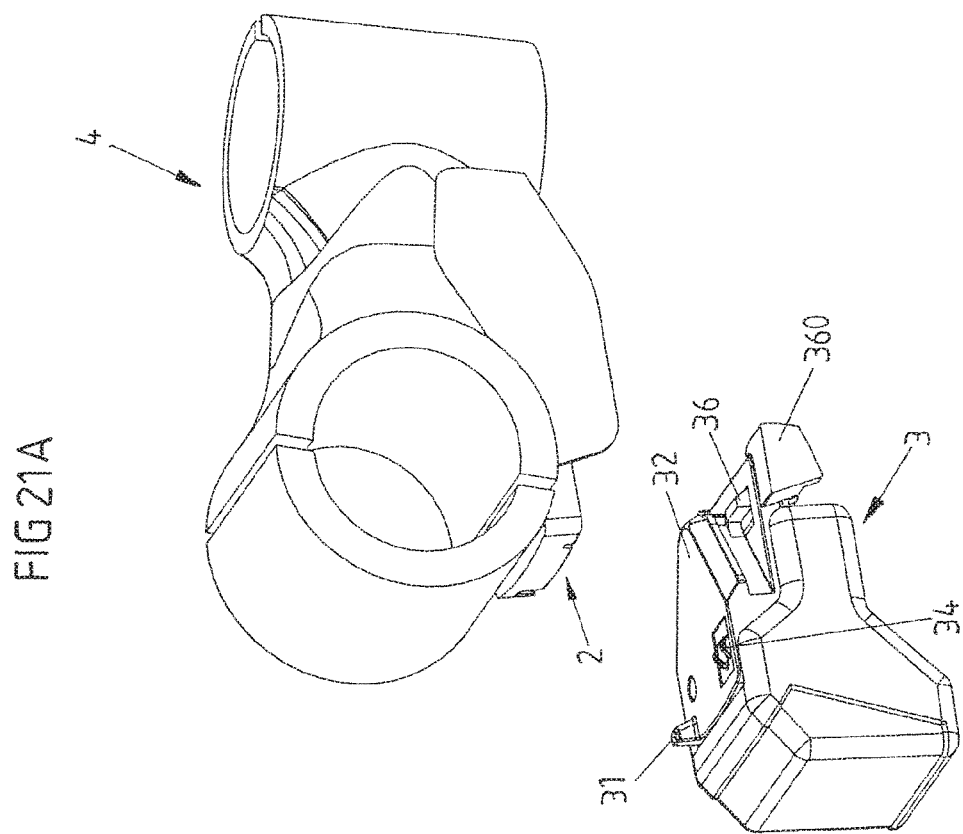

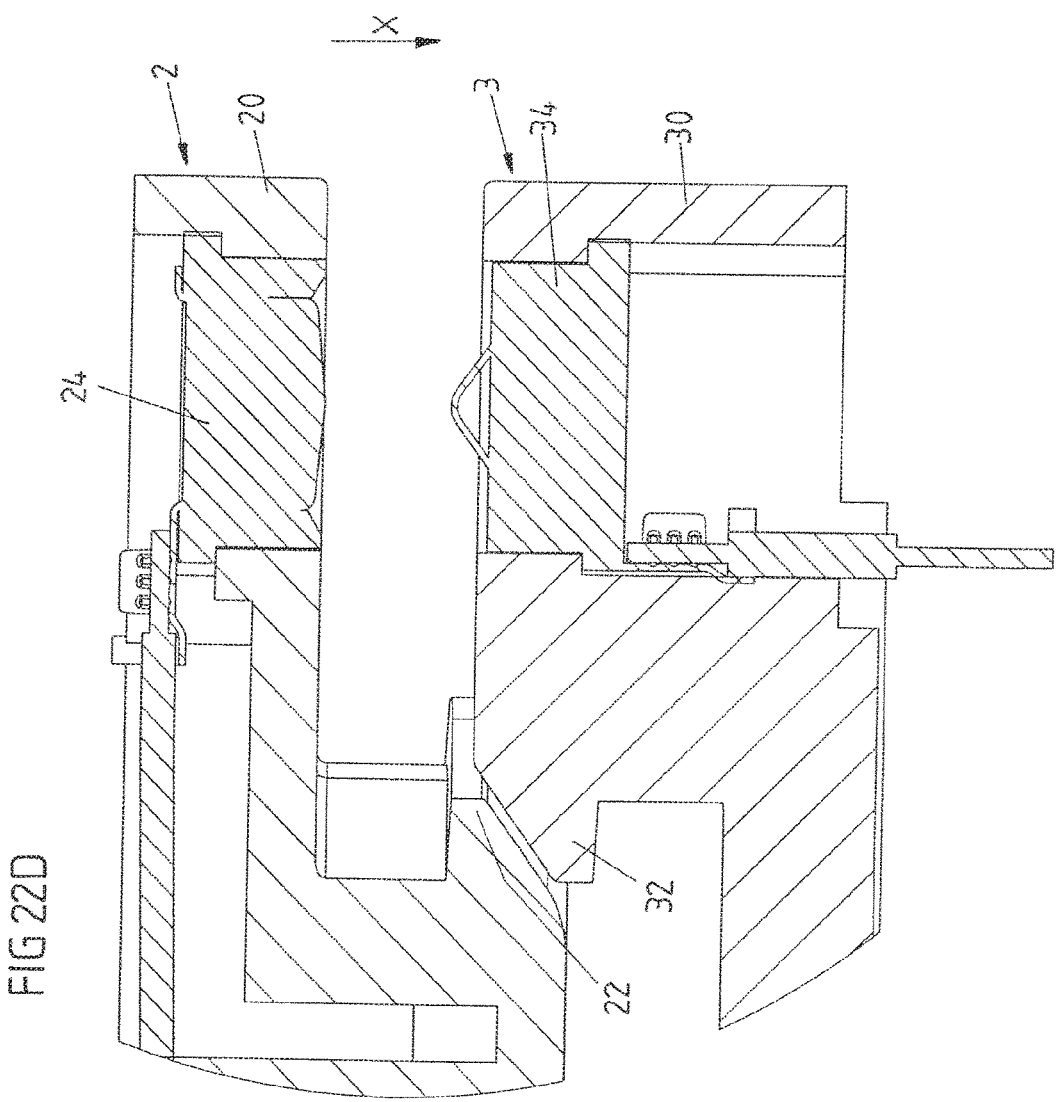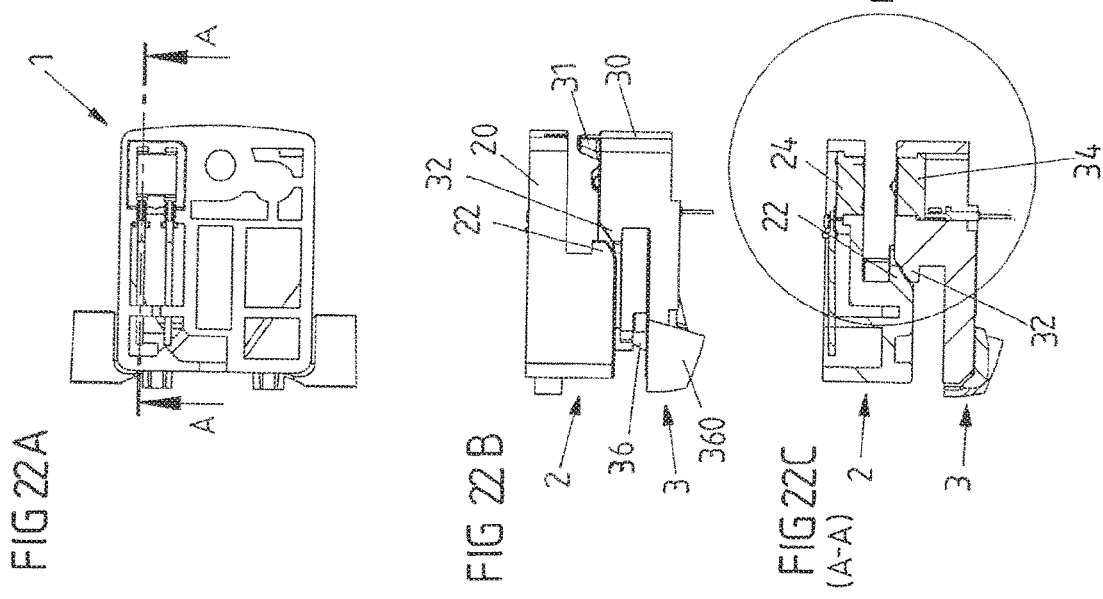

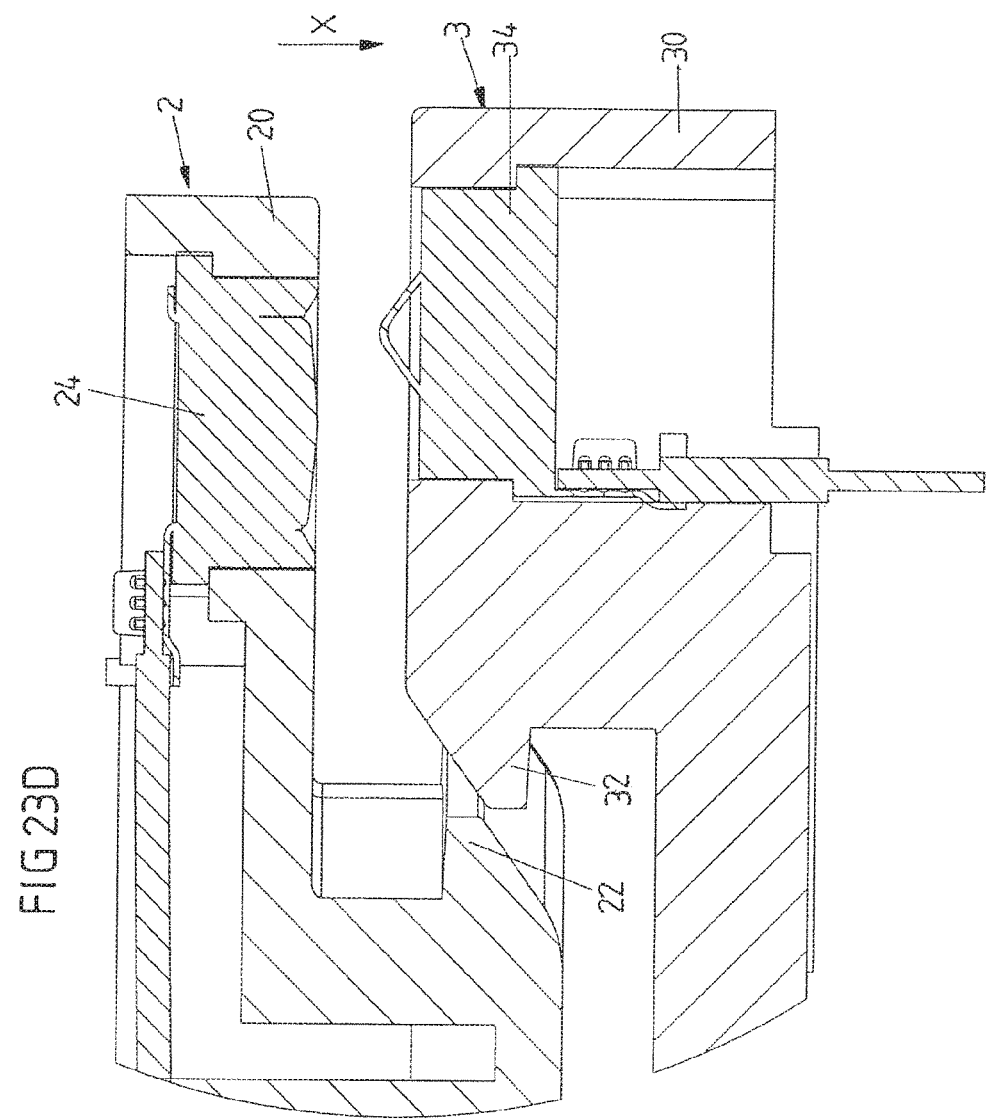
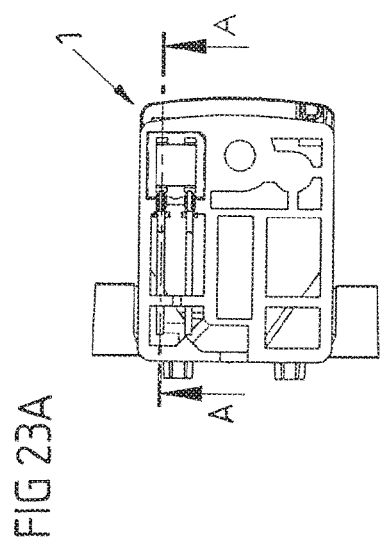
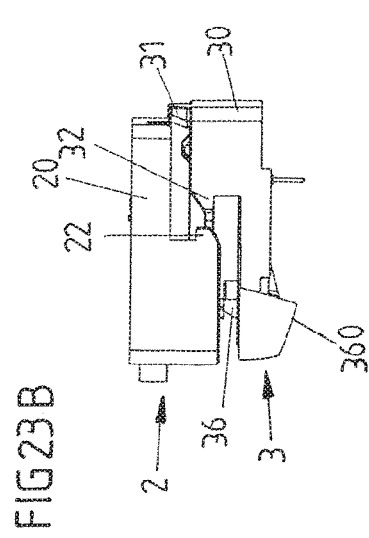
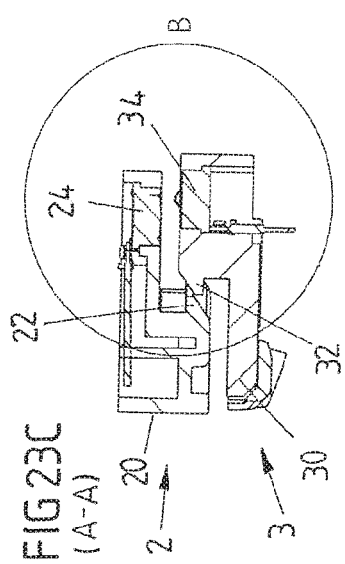

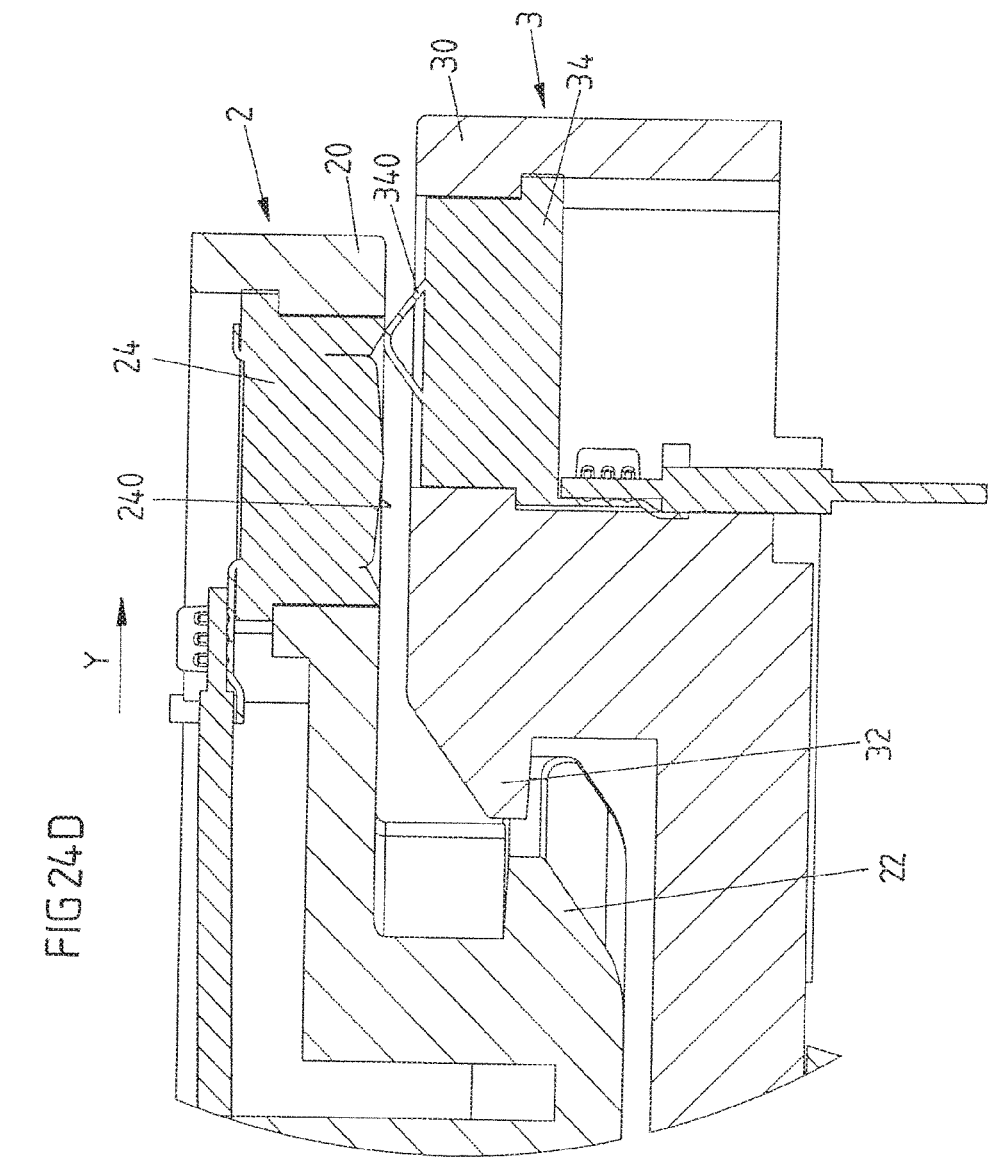
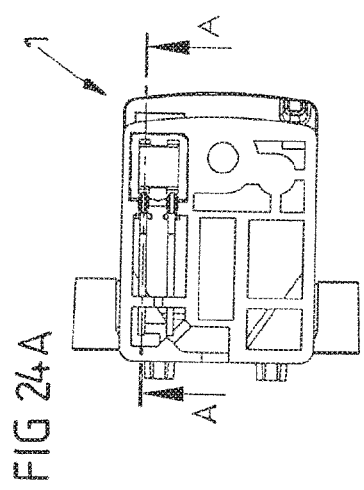
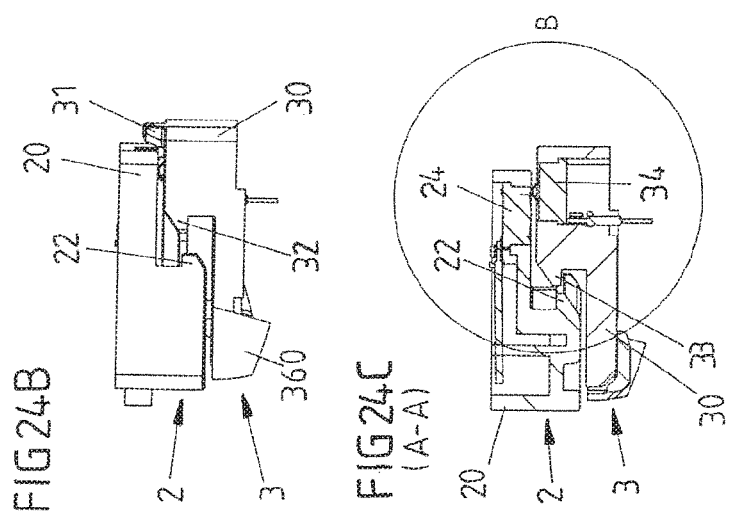

(A-A)

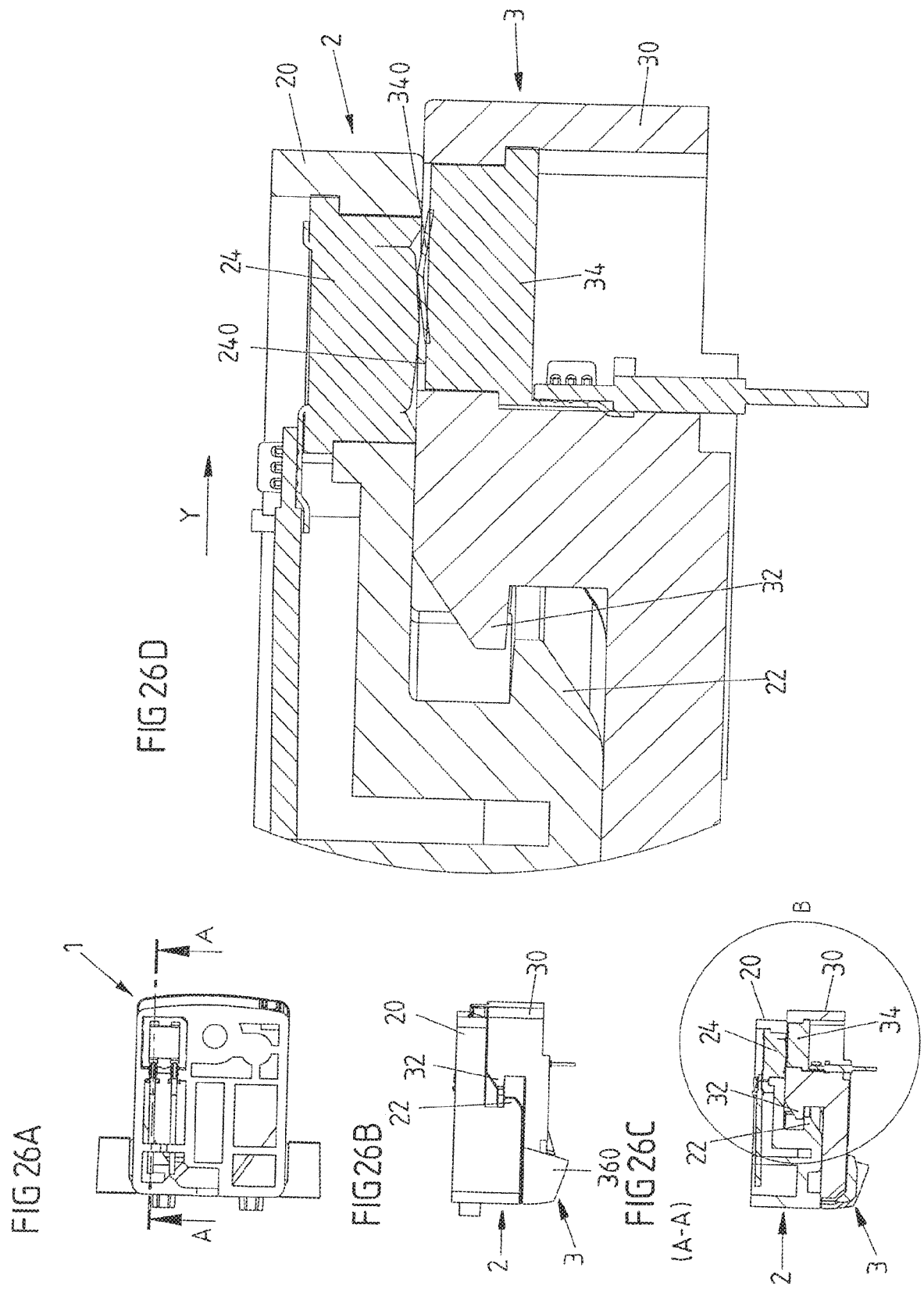

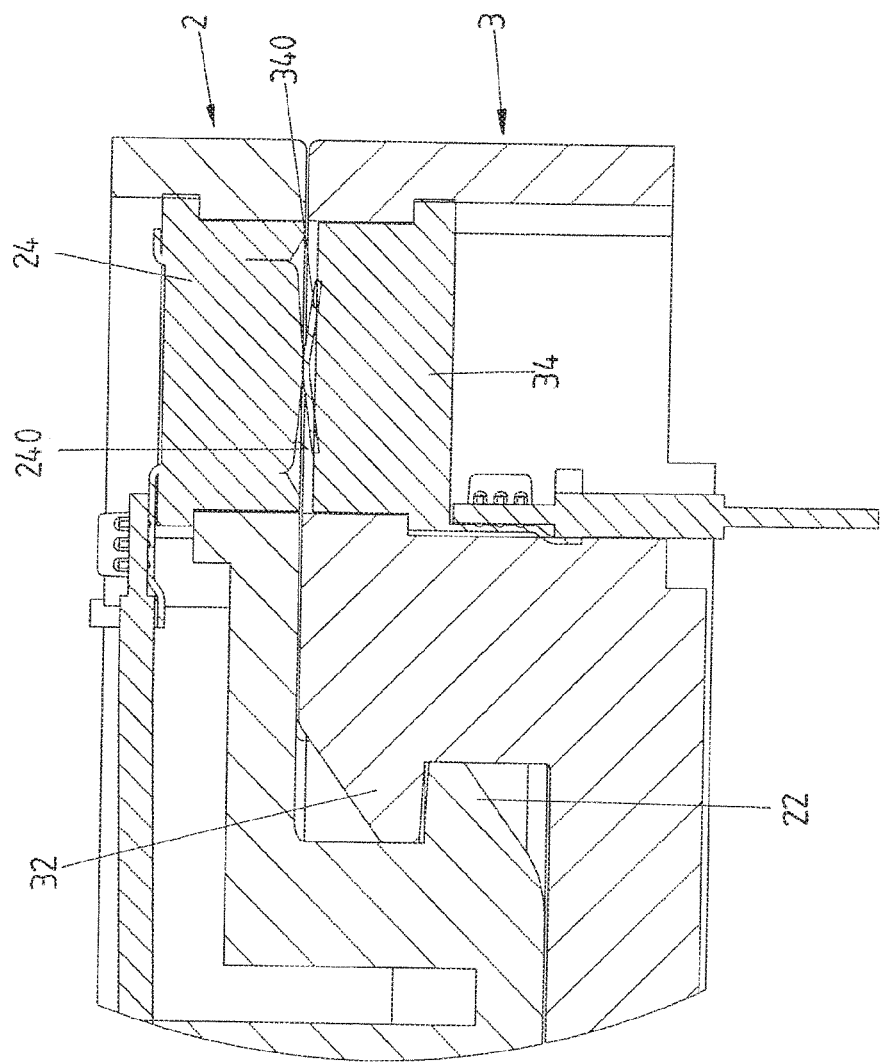
FIG 27D
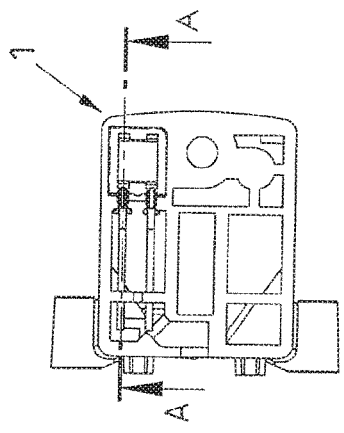
FIG 27A
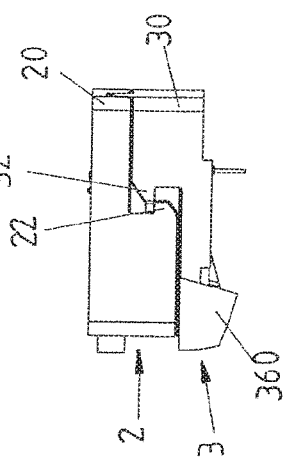
FIG 27B
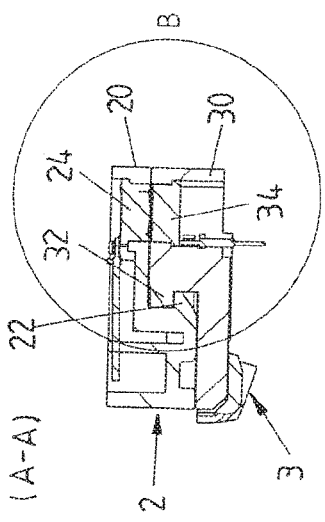
FIG 27C (A-A)

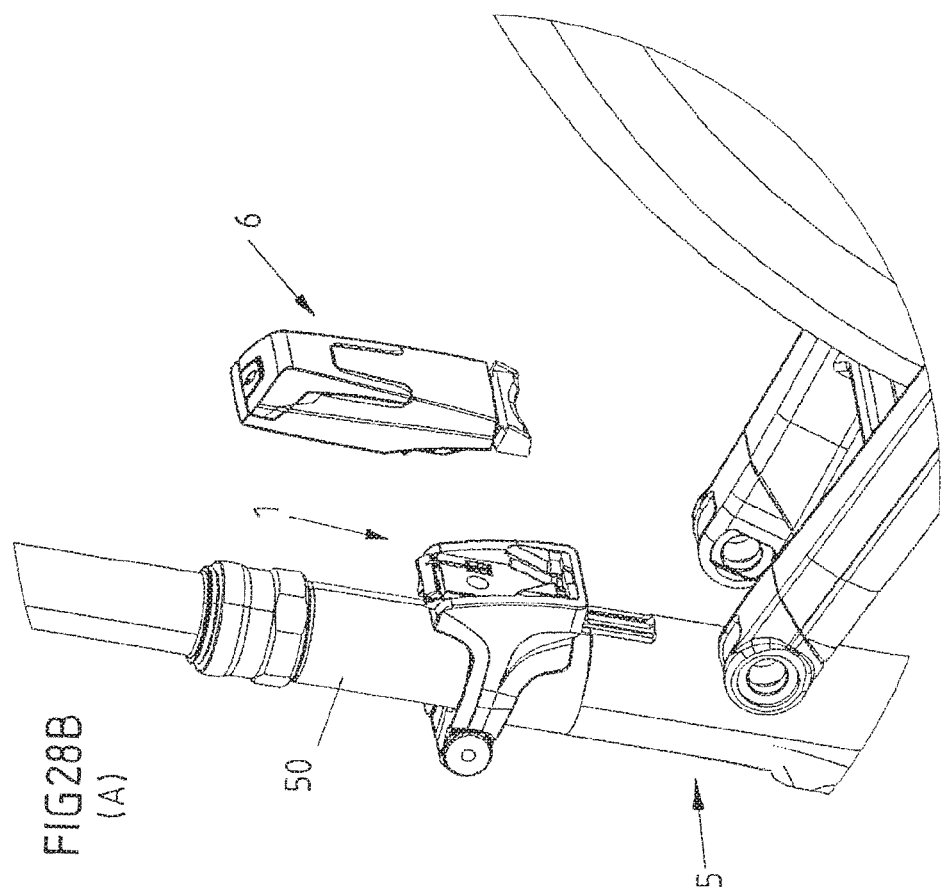
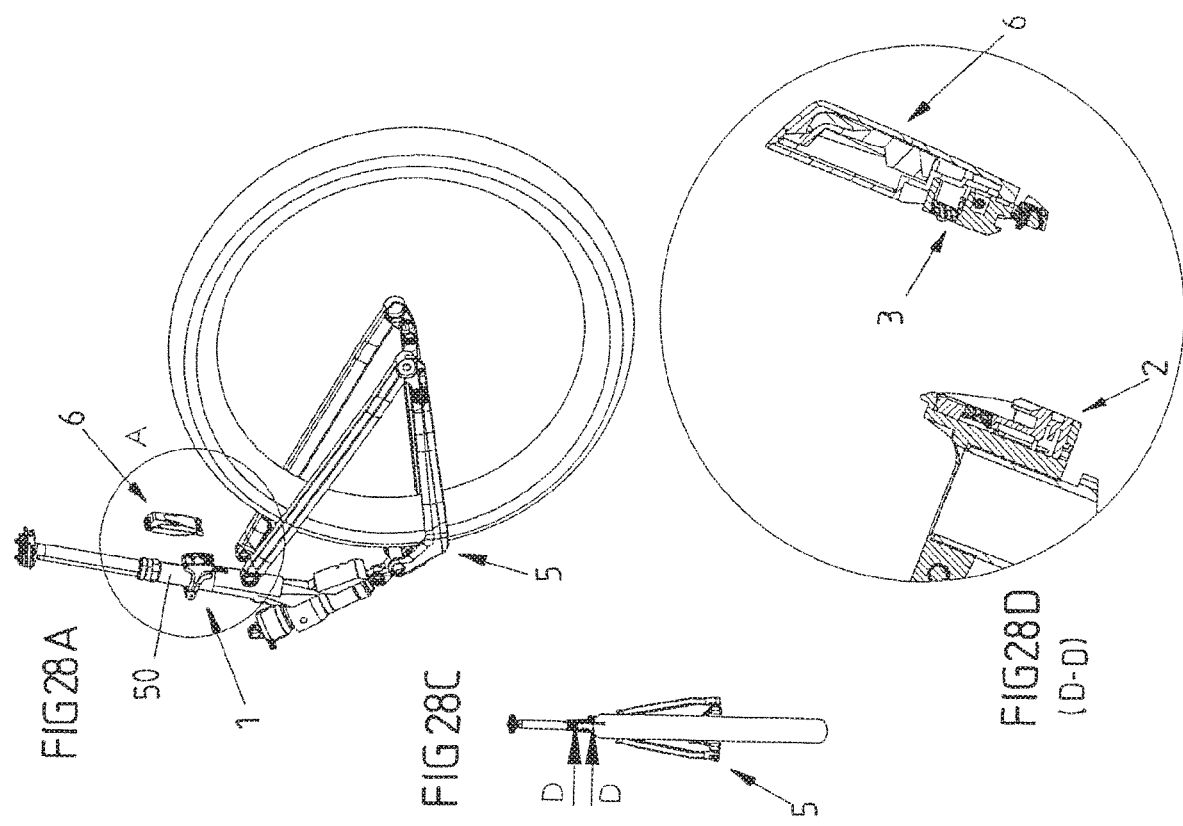
FIG 28B
(A)
FIG 28A
FIG 28C
FIG 28D
(D-D)

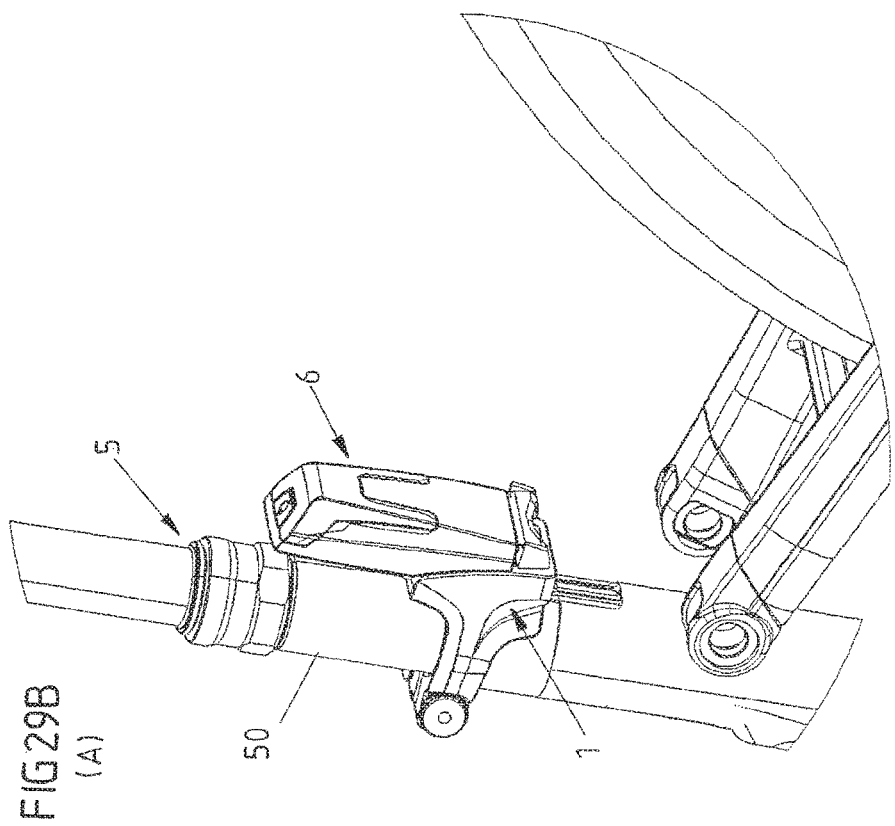
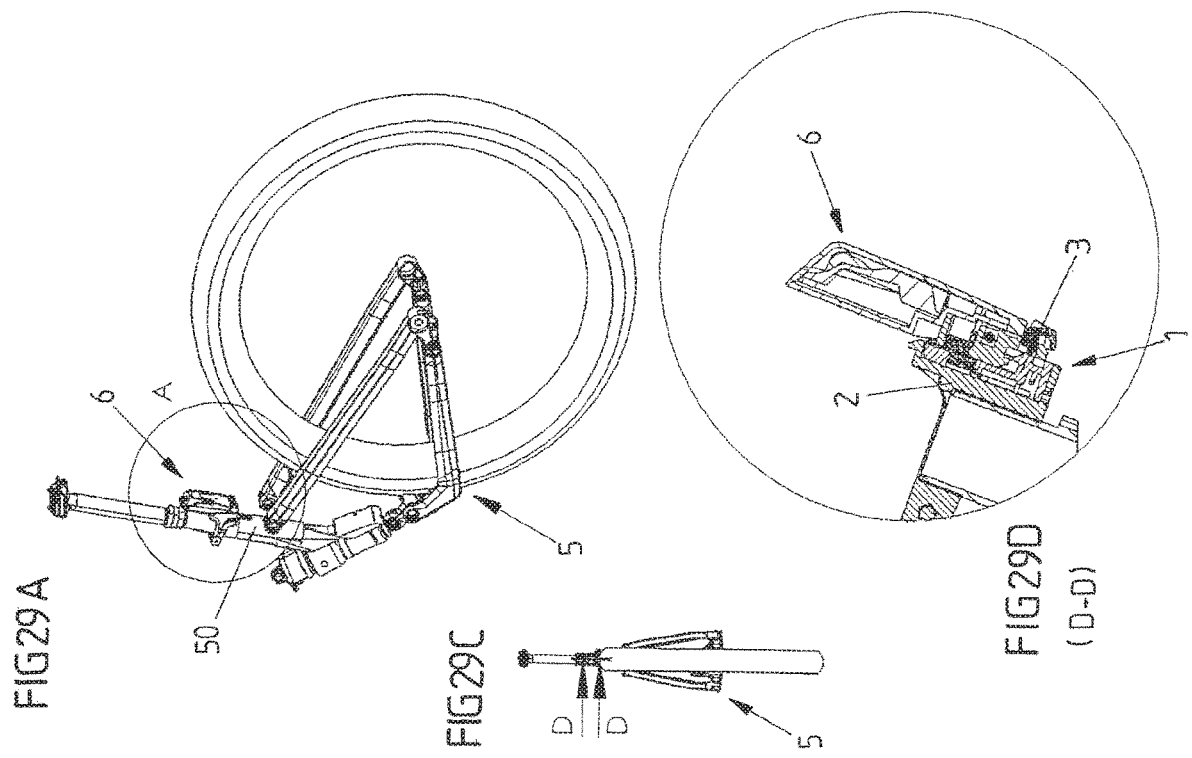

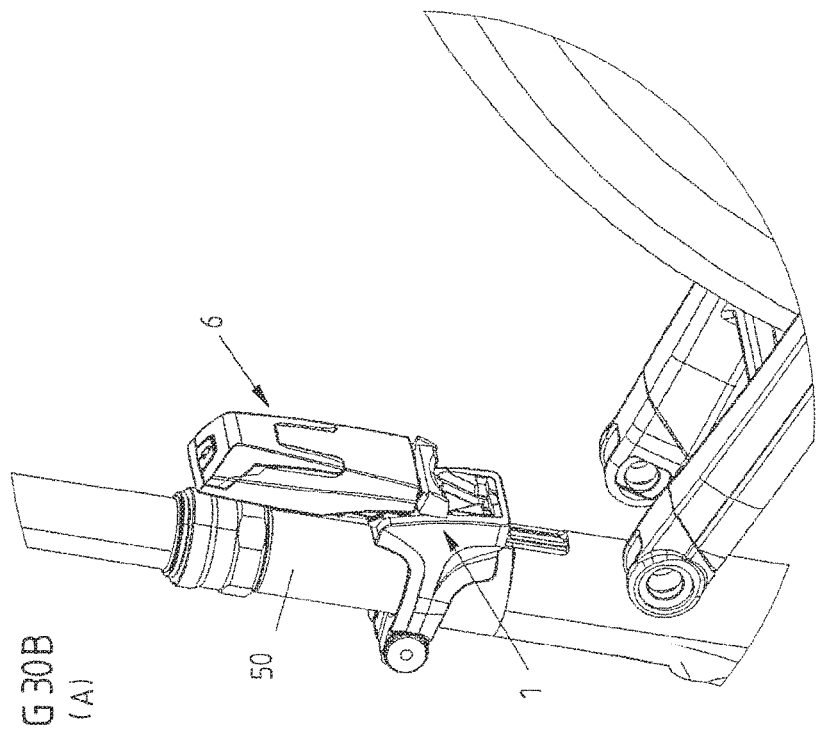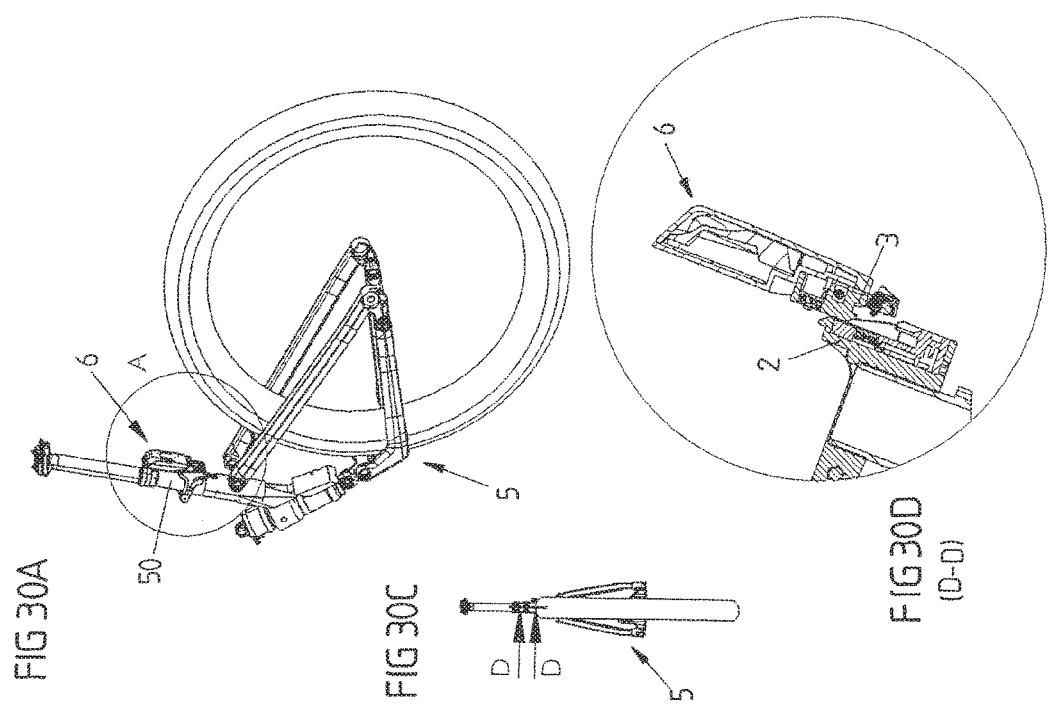

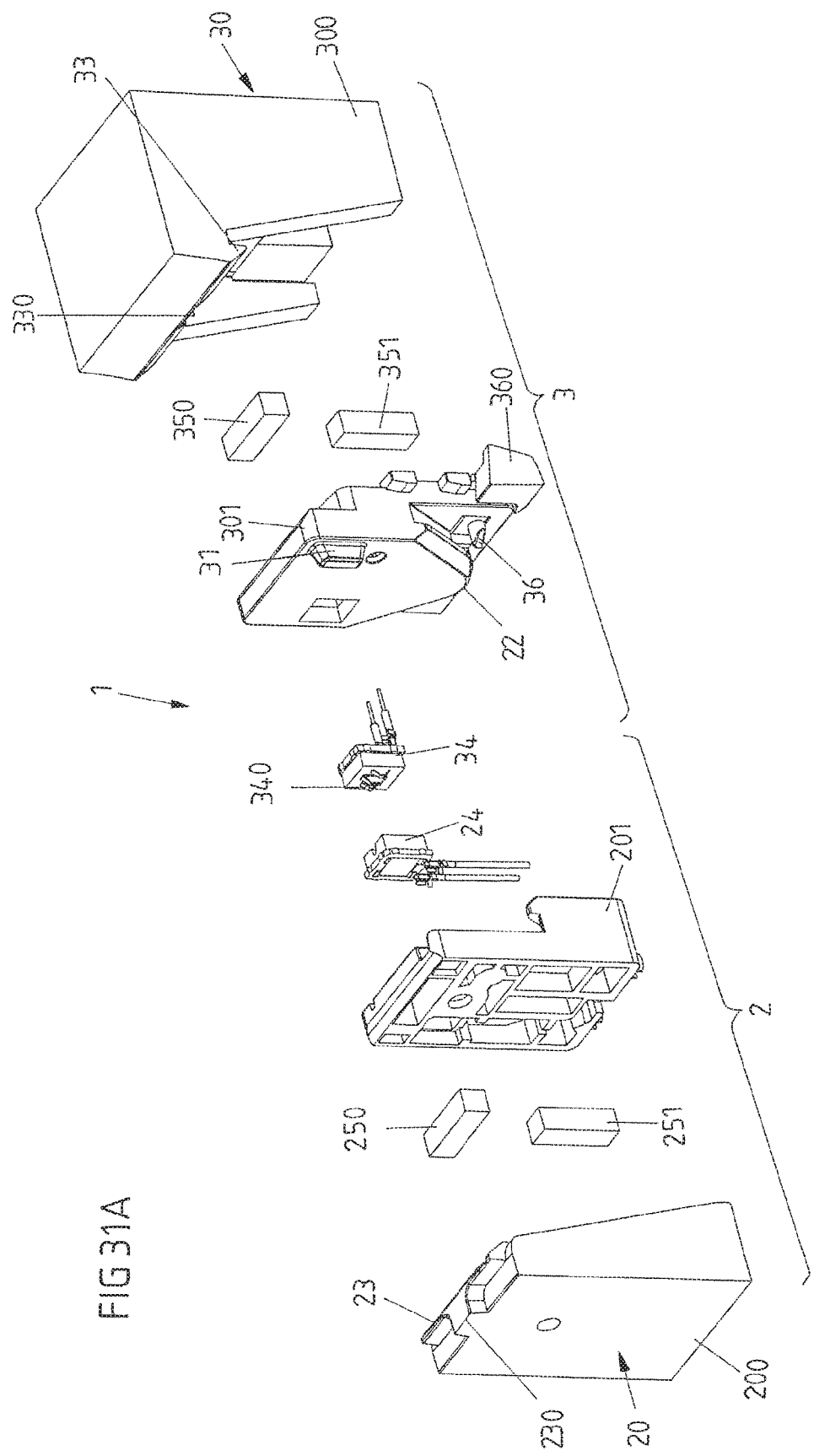

CLOSING DEVICE WITH ELECTRICAL CONTACT

CROSS-REFERENCE TO RELATED APPLICATIONS

This application is the United States national phase of International Application No. PCT/EP2018/068438 filed Jul. 6, 2018, and claims priority to German Patent Application No. 102017212149.1 filed Jul. 14, 2017, the disclosures of which are hereby incorporated by reference in their entirety.

BACKGROUND OF THE INVENTION

Field of the Invention

The disclosure relates to a closing device for connecting two parts.

Prior Art

Such a closing device comprises a first closing part which has a first engaging projection and a second closing part which has a second engaging projection. In order to close the closing device, the first closing part and the second closing part can be attached to each other and, in a closed position, are interconnected mechanically by the first engaging projection and the second engaging projection being in engagement with each other in a positive locking manner in the closed position. A magnetic device acting between the first closing part and the second closing part serves to assist the attaching of the first closing part and the second closing part to each other by providing a magnetic attraction force.

In the case of a closing device known from KR 20 1996 009 916 Y1, a closing part is fastened to an object via a fastening plate. The fastening plate here has openings which can be brought into engagement with engaging projections of the closing part. The openings are provided with spring tongues which, when the closing part is attached to the fastening plate, yield elastically and, after a positive locking connection of the engaging projections of the closing part with the edge of the openings of the fastening plate is produced, pass back into their basic position in order, in the basic position, to block release of the engaging projections from their engagement.

In the case of a closure known from DE 43 12 032 C2, a pin is arranged on a first closing part and can be brought into engagement with an engaging recess on a second closing part. During the attachment, the pin pushes aside a blocking element which, after production of the engagement of the pin of the first closing part with the engaging recess of the second closing part, passes back into a basic position in which the engagement of the pin with the engaging recess is blocked. In order to release the pin from the engaging recess, the blocking element can be actuated in order to release the pin and to remove same from the engaging recess.

There is a need for closing devices which can be closed in a haptically pleasant, smooth-running manner, ensure secure holding in the closed position and therefore a secure connection between parts to be connected and, in addition, can be opened in an easy comfortable manner.

In addition, it may be desirable to interconnect electrical assemblies in order to transmit electrical signals between the electrical assemblies, for example in order to provide an energy supply or to transmit data signals.

SUMMARY

It is an object underlying the proposed solution to provide a closing device which permits easy closing, secure holding in the closed position and simple opening and which can be suitable in articular for connecting electrical assemblies.

This object is achieved by a closing device having the features.

According thereto, the first closing part has a first electrical contact element, and the second closing part has a second electrical contact element. In the closed position, the first electrical contact element and the second electrical contact element are operatively connected to one another in an electrically contacting manner.

Therefore, when two assemblies are held mechanically on each other, an electrical contact connection can be produced via the closing device. The closing device therefore makes it possible in a simple manner to attach assemblies to one another, with a simple, magnetically assisted closing operation and with additionally mechanically secure holding in the closed position. The closing of the closing device simultaneously also brings about electrical contact connection of contact elements, and therefore, in the closed position, the closing parts of the closing device are also connected electrically to one another.

The present closing device provides in each case (at least) one engaging projection on two closing parts, said engaging projection being designed in the manner of an undercut and, for example, being able to be arranged rigidly on a basic body of the respectively associated closing part. The engaging projections are brought into engagement with one another in order to close the closing device, wherein, for this purpose, the engaging projections are, for example, moved past one another to such an extent that the first engaging projection can be pushed in the engaging direction into engagement in a positive locking manner with the second engaging projection. In the closed position, the engaging projections produce a secure holding of the closing parts on each other, and therefore the closing device can be loaded without the closing parts being released from each other.

In order, in the closed position, to prevent an undesirable release of the closing parts from each other, in one refinement a blocking element is additionally provided which is designed, for example, as an elastic spring tongue arranged on a basic body of one of the closing parts or as a, for example, pivotable blocking part arranged resiliently on the basic body. When the first closing part is attached to the second closing part, the blocking element yields in such a manner that the first engaging projection of the first closing part can be pushed in the engaging direction into engagement with the second engaging projection of the second closing part. During the attachment, the blocking element is therefore pushed aside in such a manner that the first engaging projection can be guided in engagement with the second engaging projection. During or after production of the engagement, the blocking element passes back into its basic position and, in said basic position, blocks the positive locking engagement of the first engaging projection with the second engaging projection counter to the engaging direction. The holding of the first engaging projection on the second engaging projection and therefore of the first closing part on the second closing part is therefore secured such that the closing device cannot be unintentionally opened.

In addition, magnetic means are provided which, for example, are in the form of a magnet on the first closing part and a magnet on the second closing part or in the form of a magnet on one of the closing parts and a magnetic armature in the form of a component produced from a ferromagnetic material on the other of the closing parts. The magnetic means act between the first closing part and the second closing part by, when the first closing part is attached to the second closing part, interacting in a magnetically attracting manner and therefore the first closing part being pulled in a magnetically assisted manner into engagement with the second closing part.

The magnetic means can advantageously be dimensioned here in such a manner that, when the closing parts are attached to each other, the engagement of the first engaging projection with the second engaging projection is very substantially produced automatically and in particular the yielding of the blocking element when the closing parts are attached to each other takes place very substantially automatically in a magnetically assisted manner. This provides a closure which is easy to close and in which, for the closing, the closing parts merely have to be attached to each other in a comparatively imprecise way and the actual closing of the closure then proceeds very substantially automatically in a magnetically assisted manner.

The blocking element can be configured in such a manner that it passes back again into its basic position during the production of the engagement or only after the production of the engagement between the first engaging projection and the second engaging projection. The blocking element can, for example, snap back into its basic position as soon as the engagement is produced (i.e. after production of the engagement). However, it is also possible that even during the production of the engagement the blocking element, because of its elastic configuration, brings about a prestress on the other closing part, said prestress pressing the first engaging projection in the engaging direction into engagement with the second engaging projection and thus already assisting the bringing into engagement during the production of the engagement.

The blocking element can be arranged, for example, pivotably on the associated closing part. The blocking element in this case can be spring-loaded in the direction of its basic position such that, after deflection, during the attachment, the blocking element automatically passes back into its basic position when the closing parts are in the closed position or approach their closed position.

In the closed position, the first engaging projection of the first closing part is in engagement in a positive locking manner with the second engaging projection of the second closing part. Said engagement is blocked here by the blocking element by the blocking element preventing moving of the closing parts with respect to each other counter to the engaging direction, and therefore the engaging projections cannot be disengaged from one another counter to the engaging direction. In order to open the closing device, the blocking can be canceled, for example by the blocking element in turn being deflected out of its basic position, for example by manual actuation. If the blocking of the positive-locking engagement between the engaging projections of the first closing part and of the second closing part is canceled, the engaging projections can be disengaged from one another counter to the engaging direction, and therefore the closing parts can be released from each other.

The first closing part or/and the second closing part advantageously has/have a run-on slope which is provided in such a manner that, when the first closing part is attached to the second closing part, the first engaging projection runs onto the second engaging projection in a closing direction different from the engaging direction, and the first closing part is pushed counter to the engaging direction until the first engaging projection can be brought into engagement in the engaging direction with the second engaging projection. The closing direction is directed, for example, transversely with respect to the engaging direction. The run-on slope describes an oblique plane which is directed at an angle of between, for example, 30° to 60°, in particular 45° (with respect to the surface normal of the oblique plane) with respect to the closing direction and the engaging direction. Such a run-on slope facilitates the attachment of the closing parts to each other. In particular whenever the engaging projections are designed as rigid elements on a basic body of the closing parts, the engaging projections have to be moved past one another to be brought into engagement, wherein, for this purpose, the first engaging projection (which is designed in the manner of an undercut) also has to be moved counter to the engaging direction to such an extent relative to the second engaging projection that the engaging projections designed in the manner of undercuts can be brought into engagement with one another. This movement counter to the engaging direction is assisted by the run-on slope, along which the closing parts slide on each other until the engaging projections can be brought into engagement with one another.

The magnetic device is advantageously formed by at least one first magnetic element of the first closing part and at least one second magnetic element of the second closing part. The magnetic elements are advantageously arranged here on the closing parts in such a manner that they magnetically attract when the first closing part is attached to the second closing part, wherein the first magnetic element and the second magnetic element, however, are offset with respect to each other in the closed position, as viewed along the engaging direction, such that a magnetic attraction force acts on the first closing part in the engaging direction. The magnetic device therefore brings about a prestress between the closing parts, which attempts to pull the first engaging projection in the engaging direction into engagement with the second engaging projection, and therefore magnetically assists the bringing into engagement and also the holding of the first engaging projection in the second engaging projection. As viewed along the engaging direction, the magnetic element of the first engaging part is therefore arranged in front of the magnetic element of the second closing part, and therefore the magnetic attraction force between the magnets has at least one force component in the engaging direction.

In principle, the magnetic device acts in a magnetically attracting manner in the closing direction which, for example, can be directed approximately perpendicularly to the engaging direction.

Owing to the action of the magnetic device, the closing parts during the attachment are therefore mutually drawn in the closing direction, wherein the action of force between the magnetic means is such that the first engaging projection of the first closing part is brought in a magnetically assisted manner into engagement with the second engaging projection of the second closing part, and therefore the closing of the closing device can take place very substantially automatically in a magnetically assisted manner.

For example, a pair of two magnetic elements which are offset with respect to each other along the engaging direction can be provided on each closing part. Tilting of the closing parts with respect to each other during the closing of the closing device can thereby be counteracted. In addition, an advantageous action of force in the direction of engagement of the engaging projections in one another can be obtained.

The magnetic elements can be formed by permanent magnet elements, wherein the magnetic elements of the closing parts in this case face one another with unlike magnetic poles and therefore interact in a magnetically attracting manner. However, it is also conceivable and possible for the magnetic elements to be formed, on the one hand, by permanent magnet elements and, on the other hand, for example, by ferromagnetic elements (magnetic armatures) which face one another and interact such that there is a magnetic attraction force between the closing parts.

The first engaging projection on the first closing part and the second engaging projection on the second closing part are advantageously formed and provided in such a manner that, in the loaded state of the closing device, the engagement is reinforced. For example, two engaging projections can in each case be provided on the first closing part and the second closing part, said engaging projections extending at an (acute) angle with respect to each other such that a V shape is produced. The point of the V points here in the engaging direction, which preferably also corresponds to a loading direction, and therefore, in the loaded state, the securing of the engaging projections of the first closing part in the engaging projections of the second closing part is reinforced.

In addition, the V shape is also advantageous in view of two further aspects. Firstly, the V-shaped arrangement has the effect that forces which deviate from the loading direction within an angle predetermined by the V shape are advantageously absorbed by the positive lock between the first engaging projections and the second engaging projections. Secondly, the V shape has such a stabilizing effect that pivoting forces which act around the closing direction on the closure in the closed position can be absorbed over a comparatively large effective width (in comparison to the depth of the engaging projections). The effective width here is approximately the width of the engaging projections arranged in a V-shaped manner in the loading direction.

In principle, however, other forms of the engaging projections on the first closing part and the second closing part are also conceivable. For example, the first engaging projection and the second engaging projection can each be configured in a curved manner.

The two first engaging projections of the first closing part and/or the two second engaging projections of the second closing part can be interconnected and can therefore produce a continuous, but optionally angled engaging device. However, the engaging projections can also be separated from one another such that there is a gap between the two first engaging projections and/or the two second engaging projections.

It is also conceivable and possible for a plurality of engaging projections which are offset with respect to one another along the engaging direction to be arranged on each closing part. The engaging projections can be arranged here on the respective closing part in the manner of a row or in the manner of a matrix such that, for the closing, a plurality of engaging projections are brought into engagement with one another. The number of the blocking elements does not have to correspond here to the number of the engaging projections. In principle, a single blocking element is sufficient for blocking the movement of the first closing part relative to the second closing part counter to the engaging direction. However, a plurality of blocking elements can advantageously also be provided.

Engaging projections can also be arranged, for example, periodically or in groups on the closing parts, and therefore the closing parts can be brought into engagement with one another in different closed positions. In particular, the engaging projections can also be realized by groups of V-shaped or curved engaging projections arranged in the manner of a row or matrix.

In one refinement, the first closing part has an additional engaging projection to the first engaging device and equally the second closing part has an additional engaging projection to the second engaging device. The additional engaging projection to the first engaging device is offset along the engaging direction with respect to the first engaging projections, and the additional engaging projection to the second engaging device is offset along the engaging direction with respect to the second engaging projections. It can be provided here that the additional engaging projection to the first engaging device and the additional engaging projection to the second engaging device are extended transversely (and rectilinearly) with respect to the engaging direction. In contrast to the first engaging projections and second engaging projections, which are arranged, for example, in a V-shaped manner with respect to one another, the additional engaging projection on each closing part therefore extends transversely with respect to the engaging direction.

If the closing device is arranged during use as intended in such a manner that the engaging direction extends vertically, the additional engaging projections are advantageously arranged above the first engaging device and the second engaging device, which can bring about an advantageous holding of the closing device.

In one refinement, at least one of the electrical contact elements has a contact spring which is elastically deformed when the closing parts are attached to each other. Owing to the contact spring, when the closing parts are attached to each other, the contact elements of the closing parts therefore enter into contact with one another under elastic prestress, and therefore a favorable electrical contact connection can be provided. In the closed position, the contact spring of the one contact element presses against the other contact element, thus ensuring a reliable electrical contact connection.

During closing of the closing device, the contact elements of the closing parts advantageously rub against one another. The contact elements can each be arranged here on a basic body of the associated closing part and can face one another with contact surfaces in such a manner that, when the engaging projections of the closing parts are brought into engagement in the engaging direction, the contact elements rub tangentially against one another. Additionally or alternatively, it can also be provided that, when the closing device is opened, i.e. when the closing parts are released from each other counter to the engaging direction, the contact elements rub against one another. The effect which can be achieved by the contact elements rubbing against one another is that, for example, dirt or the like possibly present on the contact elements is eliminated, and therefore the electrical contact connection between the closing parts can be improved.

In one refinement, one of the closing parts has a guide element, for example, in the form of a projection which protrudes from a basic body and, when the closing parts are attached, enters into engagement with a guide opening in the other closing part. Via the guide element and the engagement thereof in the associated guide opening in the other closing part, guidance of the closing parts on each other is therefore provided, in particular along the engaging direction in which the engaging projections of the closing parts can be brought into engagement with one another during the attachment of the closing parts.

In a further refinement, each closing part can have a basic body which is assembled from two partial bodies. The partial bodies here can be manufactured from different materials, for example from different plastics materials (for example having a different hardness) or, on the one hand, from a metal material and, on the other hand, from a plastics material. In this manner, for example, an inner partial body can be manufactured from an electrically insulating material for the electrical insulation of the contact element arranged on the respective closing part while an outer partial body can be manufactured, for example, from a metal material for providing a loadable, impact-resistant housing.

The object is also achieved by a closing device for releasably connecting two parts, comprising
  a first closing part which has a first engaging projection for forming a first engaging device,
  a second closing part which has a second engaging projection for forming a second engaging device, wherein the first closing part and the second closing part can be attached to each other in order to close the closing device by the first engaging projection and the second engaging projection being able to be brought in an engaging direction into engagement with each other in a positive locking manner such that, in a closed position in which the first engaging projection and the second engaging projection are in engagement with each other in a positive locking manner, the first closing part and the second closing part are mechanically connected to each other, and
  a magnetic device which acts between the first closing part and the second closing part and is designed to assist the attaching of the first closing part and the second closing part to each other by providing a magnetic attraction force.

In addition, it is provided that the first closing part has an additional engaging projection to the first engaging device and the second closing part has an additional engaging projection to the second engaging device, wherein the additional engaging projection to the first engaging device is offset along the engaging direction with respect to the first engaging device and the additional engaging projection to the second engaging device is offset along the engaging direction with respect to the second engaging projections.

Advantageous refinements are specified in the dependent claims which are referred thereto, wherein, for the explanation, reference should in particular also be made to that which has been stated above.

In particular, the first engaging projection on the first closing part and the second engaging projection on the second closing part can be formed and provided in such a manner that, in the loaded state of the closing device, the engagement is reinforced. For example, two engaging projections can in each case be provided on the first closing part and the second closing part, said engaging projections extending at an (acute) angle with respect to each other such that a V shape is produced. The point of the V points here in the engaging direction, which preferably also corresponds to a loading direction, and therefore, in the loaded state, the securing of the engaging projections of the first closing part in the engaging projections of the second closing part is reinforced.

In one refinement, the first closing part has a first electrical contact element, and the second closing part has a second electrical contact element. In the closed position, the first electrical contact element and the second electrical contact element are operatively connected to one another in an electrically contacting manner. Therefore, when two assemblies are held mechanically on each other, an electrical contact connection can be produced via the closing device. The closing device therefore makes it possible in a simple manner to attach assemblies to one another, with a simple, magnetically assisted closing operation and with additionally mechanically secure holding in the closed position. The closing of the closing device simultaneously also brings about electrical contact connection of contact elements, and therefore, in the closed position, the closing parts of the closing device are also connected electrically to one another.

In order, in the closed position of the closing device, to prevent an undesirable release of the closing parts from each other, in one refinement a blocking element is additionally provided which is designed, for example, as an elastic spring tongue arranged on a basic body of one of the closing parts or as a, for example, pivotable blocking part arranged resiliently on the basic body.

When the first closing part is attached to the second closing part, the blocking element yields in such a manner that the first engaging projection of the first closing part can be pushed in the engaging direction into engagement with the second engaging projection of the second closing part. During the attachment, the blocking element is therefore pushed aside in such a manner that the first engaging projection can be guided in engagement with the second engaging projection. During or after production of the engagement, the blocking element passes back into its basic position and, in said basic position, blocks the positive locking engagement of the first engaging projection with the second engaging projection counter to the engaging direction. The holding of the first engaging projection on the second engaging projection and therefore of the first closing part on the second closing part is therefore secured such that the closing device cannot be unintentionally opened.

The blocking element can be configured in such a manner that it passes back again into its basic position during the production of the engagement or only after the production of the engagement between the first engaging projection and the second engaging projection. The blocking element can, for example, snap back into its basic position as soon as the engagement is produced (i.e. after production of the engagement). However, it is also possible that even during the production of the engagement the blocking element, because of its elastic configuration, brings about a prestress on the other closing part, said prestress pressing the first engaging projection in the engaging direction into engagement with the second engaging projection and thus already assisting the bringing into engagement during the production of the engagement.

The blocking element can be arranged, for example, pivotably on the associated closing part. The blocking element in this case can be spring-loaded in the direction of its basic position such that, after deflection, during the attachment, the blocking element automatically passes back into its basic position when the closing parts are in the closed position or approach their closed position.

In the closed position, the first engaging projection of the first closing part is in engagement in a positive locking manner with the second engaging projection of the second closing part. Said engagement is blocked here by the blocking element by the blocking element preventing moving of the closing parts with respect to each other counter to the engaging direction, and therefore the engaging projections cannot be disengaged from one another counter to the engaging direction. In order to open the closing device, the blocking can be canceled, for example by the blocking element in turn being deflected out of its basic position, for example by manual actuation.

If the blocking of the positive-locking engagement between the engaging projections of the first closing part and of the second closing part is canceled, the engaging projections can be disengaged from one another counter to the engaging direction, and therefore the closing parts can be released from each other.

In principle, the magnetic device acts in a magnetically attracting manner in the closing direction which, for example, can be directed approximately perpendicularly to the engaging direction. Owing to the action of the magnetic device, the closing parts during the attachment are therefore mutually drawn in the closing direction, wherein the action of force between the magnetic means is such that the first engaging projection of the first closing part is brought in a magnetically assisted manner into engagement with the second engaging projection of the second closing part, and therefore the closing of the closing device can take place very substantially automatically in a magnetically assisted manner.

For example, a pair of two magnetic elements which are offset with respect to each other along the engaging direction can be provided on each closing part. Tilting of the closing parts with respect to each other during the closing of the closing device can thereby be counteracted. In addition, an advantageous action of force in the direction of engagement of the engaging projections in one another can be obtained.

The magnetic elements can be formed by permanent magnet elements, wherein the magnetic elements of the closing parts in this case face one another with unlike magnetic poles and therefore interact in a magnetically attracting manner. However, it is also conceivable and possible for the magnetic elements to be formed, on the one hand, by permanent magnet elements and, on the other hand, for example, by ferromagnetic elements (magnetic armatures) which face one another and interact such that there is a magnetic attraction force between the closing parts.

In one refinement, one of the closing parts has a guide element, for example, in the form of a projection which protrudes from a basic body and, when the closing parts are attached, enters into engagement with a guide opening in the other closing part. Via the guide element and the engagement thereof in the associated guide opening in the other closing part, guidance of the closing parts on each other is therefore provided, in particular along the engaging direction in which the engaging projections of the closing parts can be brought into engagement with one another during the attachment of the closing parts.

In a further refinement, each closing part can have a basic body which is assembled from two partial bodies. The partial bodies here can be manufactured from different materials, for example from different plastics materials (for example having a different hardness) or, on the one hand, from a metal material and, on the other hand, from a plastics material. In this manner, for example, an inner partial body can be manufactured from an electrically insulating material for the electrical insulation of the contact element arranged on the respective closing part while an outer partial body can be manufactured, for example, from a metal material for providing a loadable, impact-resistant housing.

The object is also achieved by a closing device for releasably connecting two parts, comprising
 a first closing part,
 a second closing part, wherein the first closing part and the second closing part can be attached to each other in order to close the closing device and, in a closed position, are latched mechanically to each other, and
 a magnetic device which acts between the first closing part and the second closing part and is designed to assist the attaching of the first closing part and the second closing part to each other by providing a magnetic attraction force,
characterized in that the first closing part has at least one first electrical contact element and the second closing part has at least one second electrical contact element, wherein the at least one first electrical contact element and the at least one second electrical contact element rub flat against one another when the closing parts are attached to each other and/or when the closing parts are released from each other, and, in the closed position, are operatively connected to one another in an electrically contacting manner.

The above-described advantages and advantageous refinements are also used in this solution, and therefore reference should be made in full to what has been explained above. In particular, the features of the claims dependent on claim 1 can also be combined with this solution.

BRIEF DESCRIPTION OF THE DRAWINGS

The concept on which the solution is based will be explained in more detail below with reference to the embodiments which are illustrated in the figures.

FIG. 1 shows a view of a closing device with two closing parts;

FIG. 2A shows a top view of the closing device, before the closing;

FIG. 2B shows a sectional view along the line B-B according to FIG. 2A;

FIG. 2C shows a side view of the closing device;

FIG. 3A shows a top view of the closing device during the closing;

FIG. 3B shows a sectional view along the line C-C according to FIG. 3A;

FIG. 3C shows a sectional view along the line B-B according to FIG. 3A;

FIG. 3D shows a side view of the closing device;

FIG. 4A shows a top view of the closing device during the further closing;

FIG. 4B shows a sectional view along the line C-C according to FIG. 4A;

FIG. 4C shows a sectional view along the line B-B according to FIG. 4A;

FIG. 4D shows a side view of the closing device;

FIG. 6A shows a top view of the closing device in a closed position;

FIG. 6B shows a sectional view along the line C-C according to FIG. 6A;

FIG. 6C shows a sectional view along the line B-B according to FIG. 6A;

FIG. 6D shows a side view of the closing device;

FIG. 8A shows a top view of the closing device during the closing;

FIG. 8B shows a sectional view along the line C-C according to FIG. 8A;

FIG. 8C shows a sectional view along the line B-B according to FIG. 8A;

FIG. 8D shows a side view of the closing device;

FIG. 9A shows a top view of the closing device during the further closing;

FIG. 9B shows a sectional view along the line C-C according to FIG. 9A;

FIG. 9C shows a sectional view along the line B-B according to FIG. 9A;

FIG. 9D shows a side view of the closing device;

FIG. 10A shows a top view of the closing device during the further closing;

FIG. 10B shows a sectional view along the line C-C according to FIG. 10A;

FIG. 10C shows a sectional view along the line B-B according to FIG. 10A;

FIG. 10D shows a side view of the closing device;

FIG. 11A shows a top view of the closing device during the further closing;

FIG. 11B shows a sectional view along the line C-C according to FIG. 11A;

FIG. 11C shows a sectional view along the line B-B according to FIG. 11A;

FIG. 11D shows a side view of the closing device;

FIG. 12A shows a top view of the closing device in the closed position;

FIG. 12B shows a sectional view along the line C-C according to FIG. 12A;

FIG. 12C shows a sectional view along the line B-B according to FIG. 12A;

FIG. 12D shows a side view of the closing device;

FIG. 13A shows a top view of the closing device, when the closing parts are attached obliquely to each other, before the closing;

FIG. 13B shows a sectional view along the line C-C according to FIG. 13A;

FIG. 13C shows a sectional view along the line B-B according to FIG. 13A;

FIG. 13D shows a side view of the closing device;

FIG. 14A shows a top view of the closing device during the further closing;

FIG. 14B shows a sectional view along the line C-C according to FIG. 14A;

FIG. 14C shows a sectional view along the line B-B according to FIG. 14A;

FIG. 14D shows a side view of the closing device;

FIG. 15A shows a top view of the closing device during the further closing;

FIG. 15B shows a sectional view along the line C-C according to FIG. 15A;

FIG. 15C shows a sectional view along the line B-B according to FIG. 15A;

FIG. 15D shows a side view of the closing device;

FIG. 17A shows a top view of the closing device in the closed position;

FIG. 17B shows a sectional view along the line C-C according to FIG. 17A;

FIG. 17C shows a sectional view along the line B, B according to FIG. 17A;

FIG. 17D shows a side view of the closing device;

FIG. 18A shows a view of an embodiment of a closing device on a holder for a bicycle;

FIG. 18B shows a top view of the holder;

FIG. 18C shows a sectional view along the line A-A according to FIG. 18B;

FIG. 19A shows a view of the closing device on the holder, during the opening;

FIG. 19B shows a top view of the holder;

FIG. 19C shows a sectional view along the line A-A according to FIG. 19B;

FIG. 21A shows a view of the closing device in an open position on the holder;

FIG. 21B shows a top view of the holder;

FIG. 21C shows a sectional view along the line A-A according to FIG. 21B;

FIG. 22A shows a top view of the closing device of the embodiment according to FIGS. 18A-18C to 21A-21C, during the closing of the closing device;

FIG. 22B shows a side view of the closing device;

FIG. 22C shows a sectional view along the line A-A according to FIG. 22A;

FIG. 22D shows an enlarged view of the detail B according to FIG. 22C;

FIG. 23A shows a top view of the closing device, during the further closing;

FIG. 23B shows a side view of the closing device;

FIG. 23C shows a sectional view along the line A-A according to FIG. 23A;

FIG. 23D shows an enlarged view of the detail B according to FIG. 23C;

FIG. 24A shows a top view of the closing device during the further closing;

FIG. 24B shows a side view of the closing device;

FIG. 24C shows a sectional view along the line A-A according to FIG. 24A;

FIG. 24D shows an enlarged view of the detail B according to FIG. 24C;

FIG. 26A shows a top view of the closing device during the further closing;

FIG. 26B shows a side view of the closing device;

FIG. 26C shows a sectional view along the line A-A according to FIG. 26A;

FIG. 26D shows an enlarged view of the detail B according to FIG. 26C;

FIG. 27A shows a top view of the closing device in the closed position;

FIG. 27B shows a side view of the closing device;

FIG. 27C shows a sectional view along the line A-A according to FIG. 27A;

FIG. 27D shows an enlarged view of the detail B according to FIG. 27C;

FIG. 28A shows a view of a bicycle with a closing device arranged thereon for attaching a rear light, with the closing device open;

FIG. 28B shows an enlarged view of the detail A according to FIG. 28A;

FIG. 28C shows a view of the bicycle from the rear;

FIG. 28D shows an enlarged sectional view along the line D-D according to FIG. 28C;

FIG. 29A shows a view of the bicycle, during the closing of the closing device;

FIG. 29B shows an enlarged view of the detail A according to FIG. 29A, during the closing of the closing device;

FIG. 29C shows a view of the bicycle from the rear;

FIG. 29D shows a sectional view along the line D-D according to FIG. 29C;

FIG. 30A shows a view of the bicycle, during the further closing of the closing device;

FIG. 30B shows an enlarged view of the detail A according to FIG. 30A;

FIG. 30C shows a view of the bicycle from the rear;

FIG. 30D shows a sectional view along the line D-D according to FIG. 30C;

FIG. 31A shows an exploded view of the closing device according to FIG. 1;

FIG. 34A shows a view of the closing device in the closed position; and

FIG. 34B shows another view of the closing device in the closed position.

DESCRIPTION OF THE INVENTION

FIG. 1 to 17A-17D and FIGS. 31A, 31B to 34A, 34B show an embodiment of a closing device 1 which has two closing parts 2, 3 and serves for releasably connecting two parts to each other.

Figure 31B:
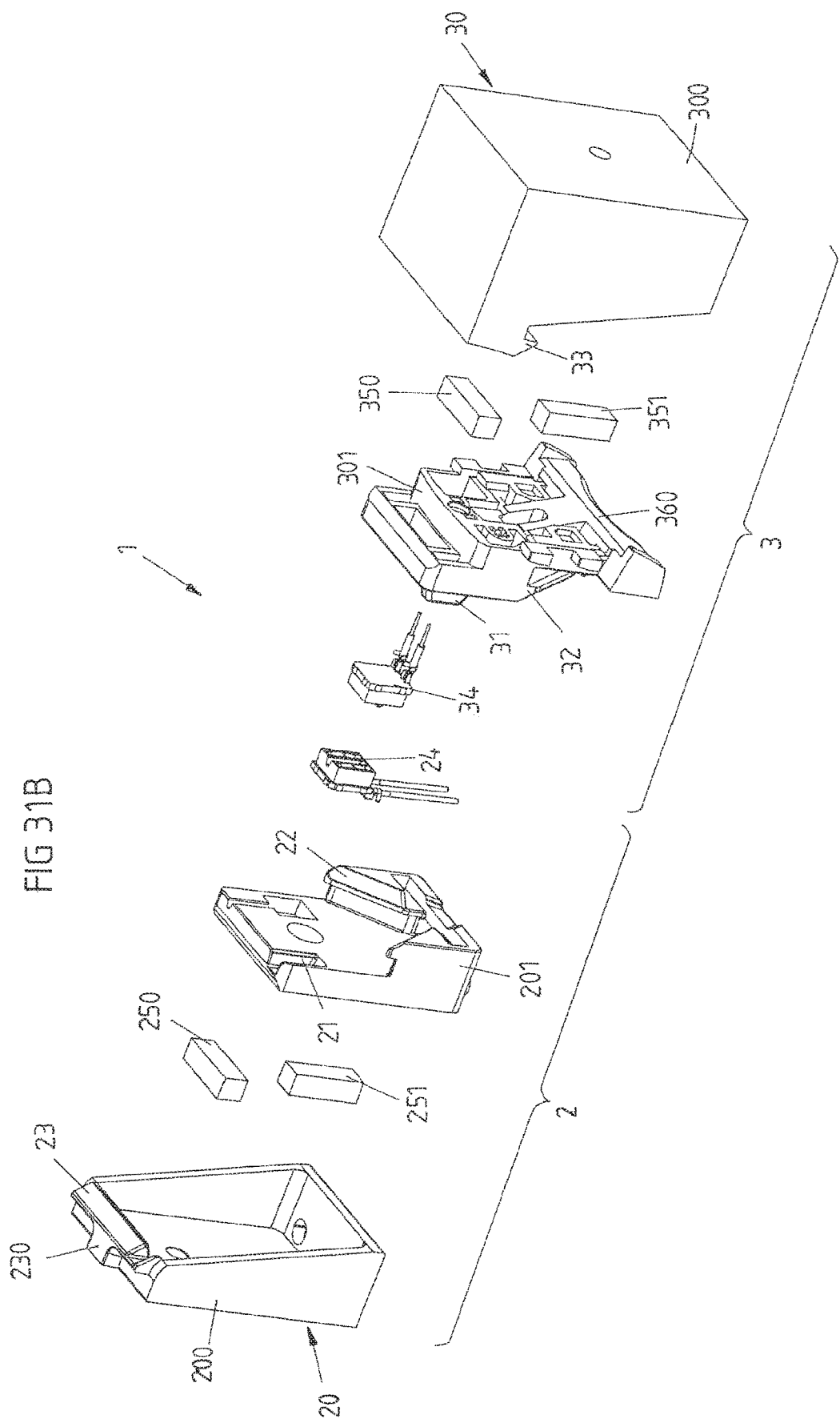
FIG. 31B shows another exploded view of the closing device.
Figure 32A:
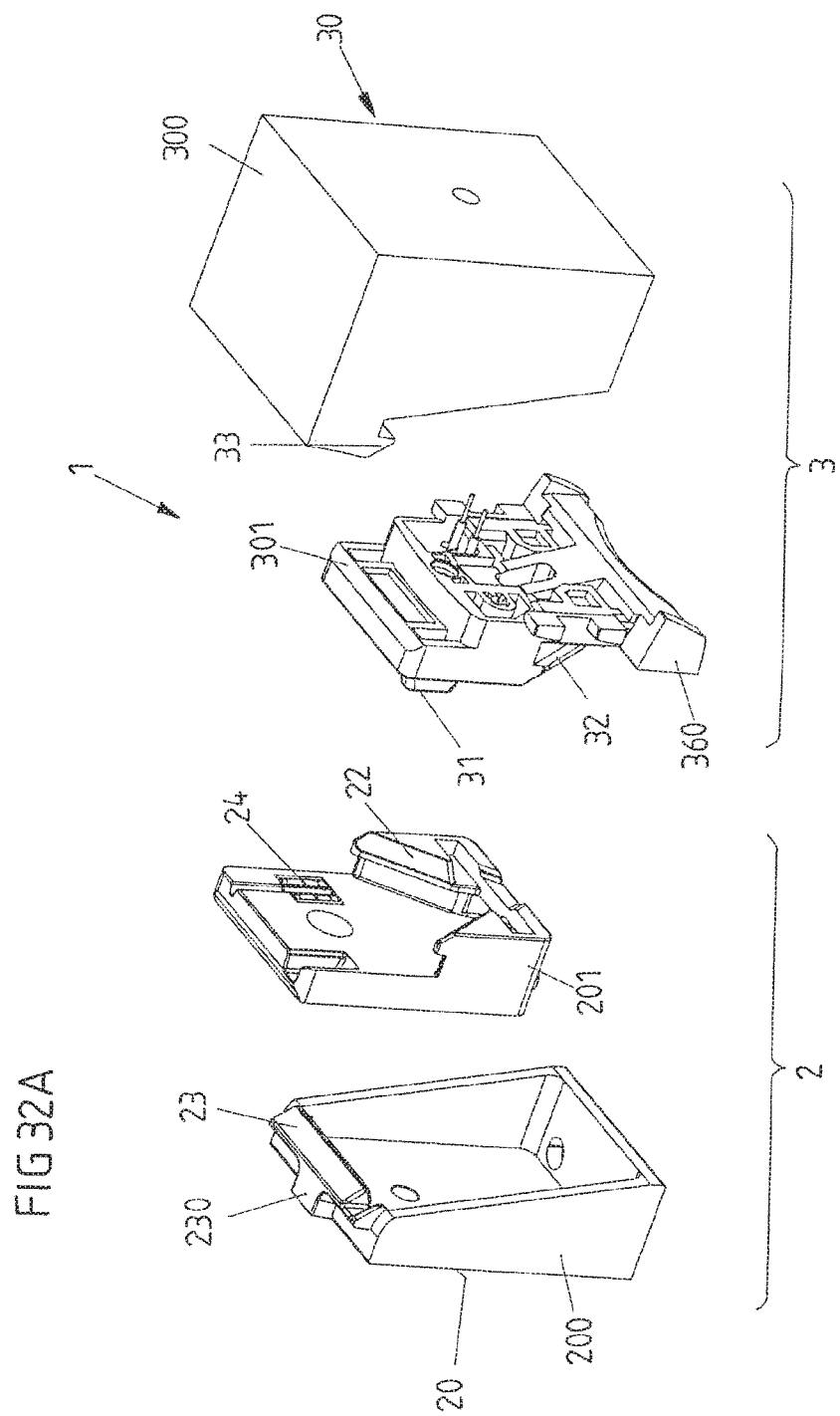
FIG. 32A shows a view of the closing device, with separated partial bodies of the closing parts.
Figure 32B:
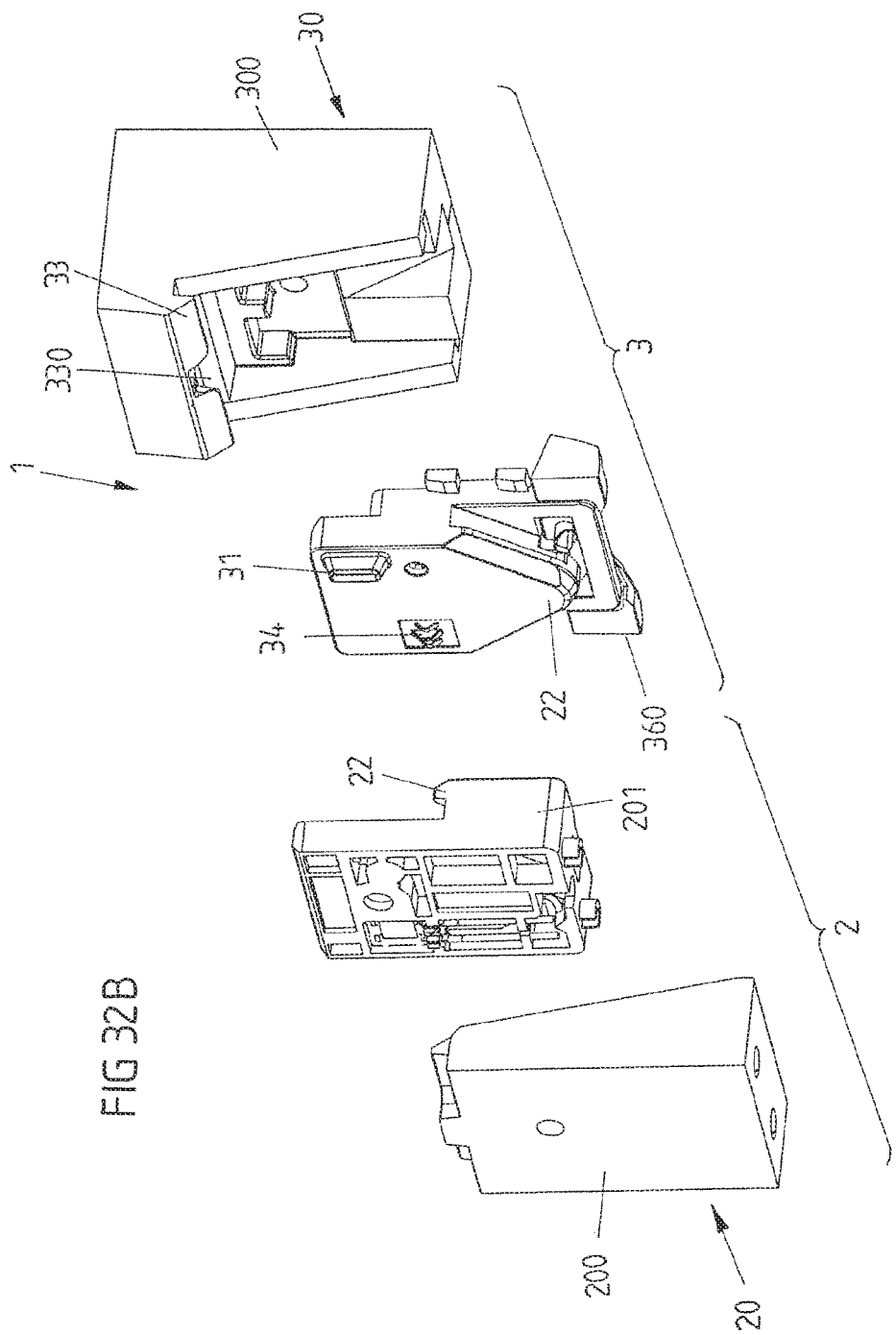
FIG. 32B shows another view of the closing device, with separated partial bodies of the closing parts.
Figure 33A:
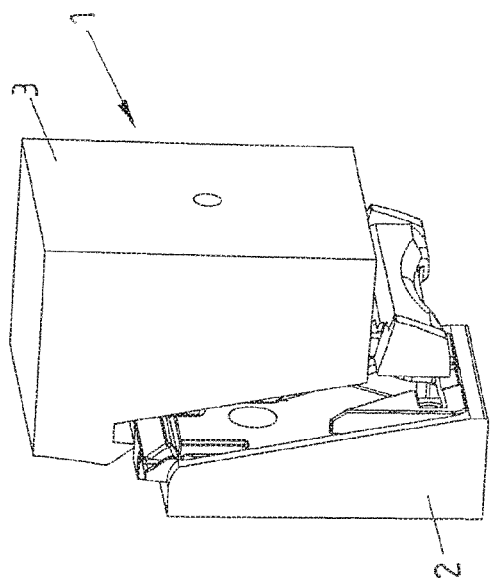
FIG. 33A shows a view of the closing device before the closing.

As is apparent from the exploded views according to FIGS. 31A and 31B, each closing part 2, 3 has a basic body 20, 30 which is assembled from two partial bodies 200, 201, 300, 301 which can be manufactured from different materials. For example, the partial bodies 200, 201, 300, 301 can be manufactured from different plastics materials or, on the one hand, from a plastics material and, on the other hand, from a metal material.

An engaging device 22, 32 which is in each case formed on the inner partial body 201, 301 and is formed by two engaging projections 220, 221, 320, 321 which are arranged at an angle to one another and form a V shape (see FIG. 1) is arranged on each of the basic bodies 20, 30.

While the engaging device 22 of the one closing part 2 is in the form of a depression, the engaging device 32 of the other closing part 3 is in the form of a raised section which can be inserted into the depression of the other engaging device 22. In order to close the closing device 1, the engaging devices 22, 32 can be attached to each other such that, in a closed position, the engaging projections 220, 221, 320, 321 are in engagement with one another in a positive locking manner and are used to mechanically interconnect the closing parts 2, 3.

In the embodiment illustrated, the engaging projections 220, 221, 320, 321 are formed as rigid sections on the inner partial bodies 201, 301 of the basic bodies 20, 30 of the closing parts 2, 3. A further, additional engaging projection 23, 33 is arranged offset with respect to the engaging devices 22, 32 on each closing part 2, 3 (as viewed along an engaging direction Y, along which the engaging devices 22, 32 can be brought into engagement with each other in a positive locking manner), said engaging projection 23, 33 being formed on the outer partial body 200, 300 of the associated basic body 20, 30 and being extended rectilinearly and transversely with respect to the engaging direction Y. The engaging projections 220, 221, 320, 321 of the engaging devices 22, 32 and the additional engaging projections 23, 33 are designed as undercuts and are in engagement with one another in pairs when, in a closed position of the closing device 1, the closing parts 2, 3 are attached to each other, and therefore the closing parts 2, 3 are mechanically held on each other counter to a closing direction X.

A pair of magnetic elements 250, 251, 350, 351 which face one another with unlike magnetic poles and therefore bring about a magnetic attraction force between the closing parts 2, 3 is arranged on each basic body 20, 30. The magnetic elements 250, 251, 350, 351 magnetically assist the attaching of the closing parts 2, 3 such that the connection between the closing parts 2, 3 is at least very substantially produced automatically.

In addition, a blocking element 36 in the form of a lever element which is pivotable about a pivot axis 361 (see, for example, FIG. 4C) is arranged on the closing part 3, said blocking element being deflectable out of a basic position and serving to secure the closing parts 2, 3 in their closed position with respect to each other, and therefore the engagement between the engaging projections 220, 221, 320, 321, 23, 33 is secured and cannot be readily released, at any rate not without canceling the blocking by the blocking element 36. In the closed position, the blocking element 36 engages in a blocking opening 26 on the other closing part 2, and therefore the closing parts 2, 3 are thereby secured with respect to each other counter to the engaging direction Y.

An electrical contact element 24, 34 which serves for producing an electrical contact connection between the closing parts 2, 3 in the closed position of the closing device 1 is arranged in each case on a side of the inner partial body 201, 301 that faces the other closing part 2, 3 in each case. In the closed position, the contact elements 24, 34 are in contact with each other in an electrically contacting manner such that a current can flow via the contact elements 24, 34.

FIGS. 2A-2C to FIGS. 6A-6D show the closing device 1 during the closing, i.e. during the attaching of the closing parts 2, 3 to each other in order to close the closing device 1.

In order to close the closing device 1, the closing parts 2, 3 can be attached to each other in a closing direction X. During the attachment, the magnetic elements 250, 251, 350, 351 of the closing parts 2, 3 interact in a magnetically attracting manner such that the closing parts 2, 3 as they approach are drawn magnetically toward each other.

If the attachment, as shown in the sequence from FIGS. 2A-2C to FIGS. 6A-6D, takes place plane-parallel, the engaging projections 220, 221, 320, 321, 23, 33 enter into contact with one another and run onto one another, as is illustrated in the transition from FIG. 3C to FIG. 4C, because of run-on slopes which are formed on the engaging projections 220, 221, 320, 321, 23, 33. By the engaging projections 220, 221, 320, 321, 23, 33 running onto one another, the engaging projections 220, 221, 320, 321, 23, 33 move past one another and enter into engagement with one another in the engaging direction Y in a positive locking manner, as is illustrated in the transition from FIG. 5C to FIG. 6C.

The magnetic elements 250, 251, 350, 351 are arranged on the basic bodies 20, 30 of the closing parts 2, 3 in such a manner that, in the closed position, the magnetic elements 250, 251, 350, 351 are offset with respect to one another and, during the closing and also in the closed position, bring about a magnetic attraction force (even) in the direction of the closed position, i.e. in the direction of engagement of the engaging projections 220, 221, 320, 321, 23, 33 with one another. It is thus apparent from FIG. 6B that, in the closed position, the magnetic elements 250, 251, 350, 351 are (slightly) offset with respect to one another along the engaging direction Y in such a manner that the magnetic attraction between the magnetic elements 250, 251, 350, 351 also acts at least with a direction component in the engaging direction Y and therefore the closing parts 2, 3 are drawn into engagement with each other in the engaging direction Y. When the closing parts 2, 3 are attached to each other, the positive locking engagement between the closing parts 2, 3 is therefore produced, preferably automatically, in a magnetically assisted manner.

Figure 5D:
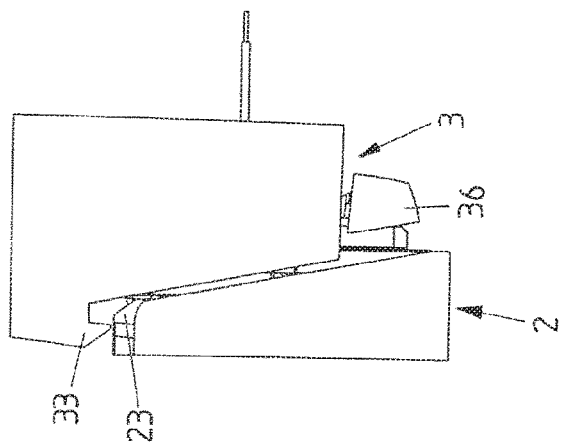
FIG. 5D shows a side view of the closing device.
Figure 5C:
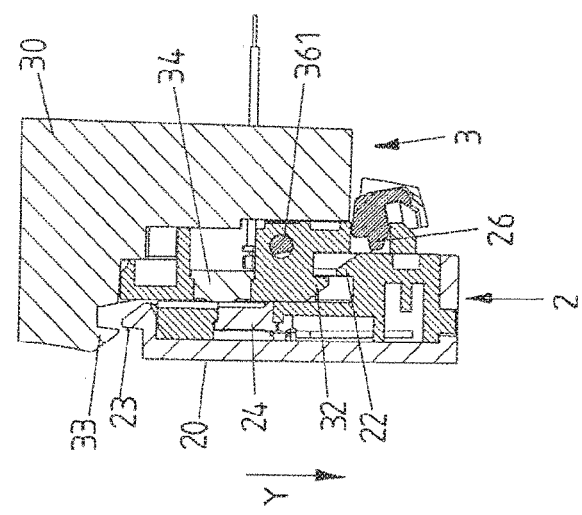
FIG. 5C shows a sectional view along the line B-B according to FIG. 5A.
Figure 5A:
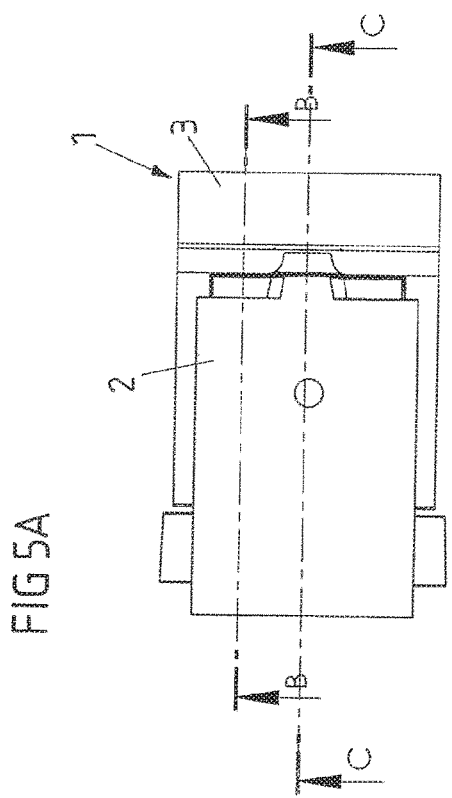
FIG. 5A shows a top view of the closing device during the further closing.
Figure 5B:
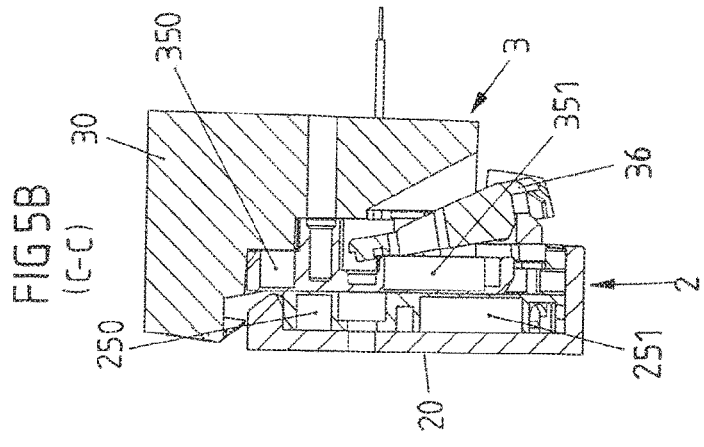
FIG. 5B shows a sectional view along the line C-C according to FIG. 5A.
Figure 7A:
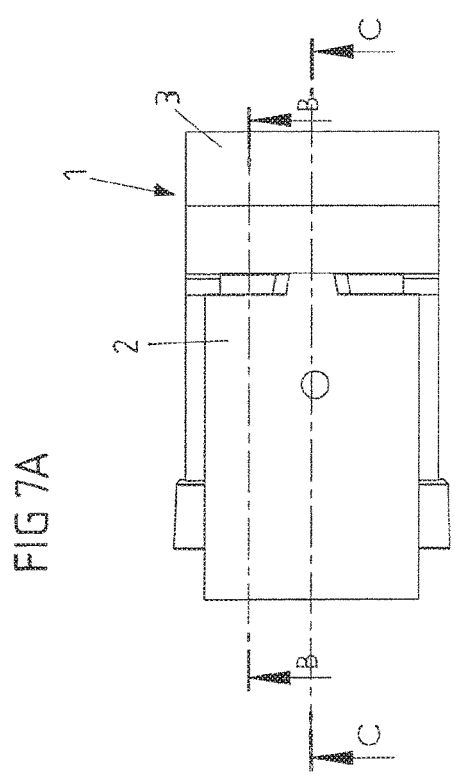
FIG. 7A shows a top view of the closing device when the closing parts are attached obliquely to each other, before the closing.
Figure 7B:
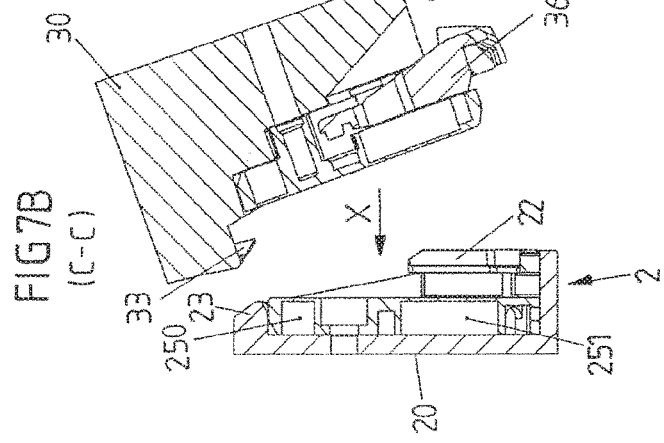
FIG. 7B shows a sectional view along the line C-C according to FIG. 7A.
Figure 7C:
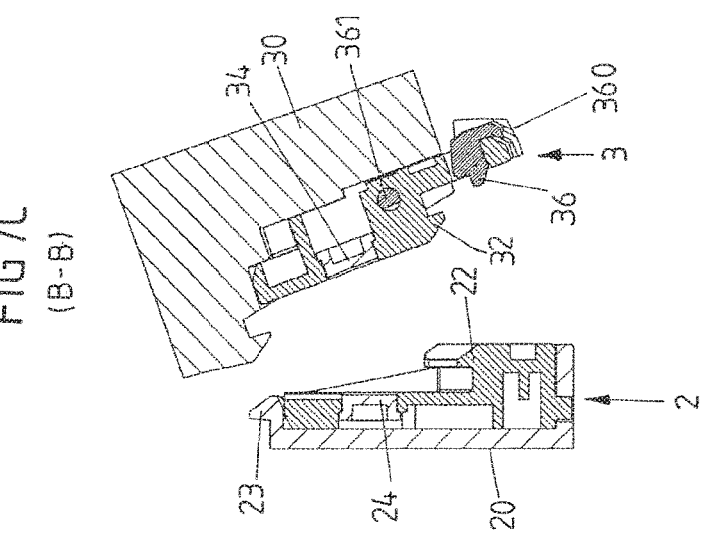
FIG. 7C shows a sectional view along the line B-B according to FIG. 7A.
Figure 7D:
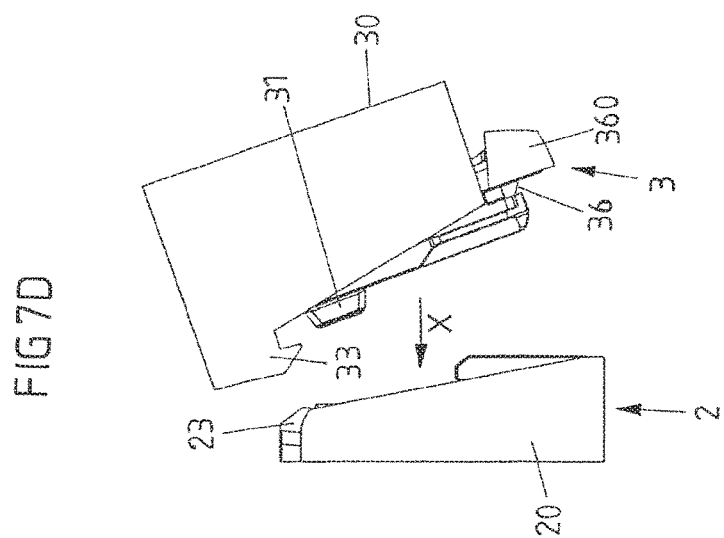
FIG. 7D shows a side view of the closing device.

When the closing parts 2, 3 are attached to each other, the blocking element 36, which is arranged pivotably on the closing part 3, is deflected out of its basic position, as is apparent from FIGS. 4C and 5C, because of an interaction of the closing part 2 with the blocking element 36. The blocking element 36 is deflected out of the basic position here counter to a prestressing effect of a spring element 37, as is apparent from FIG. 4B, and therefore a spring-mechanical stress acts on the blocking element 36 in the direction of the basic position. Accordingly, when the closed position of the closing parts 2, 3 is reached, the blocking element 36 is set back into the basic position and enters into engagement with the blocking opening 26 on the closing part 2, as is apparent from FIG. 6C.

By the engagement of the blocking element 36 in the blocking opening 26, the position of the closing parts 2, 3 with respect to each other along the engaging direction Y is secured. Owing to the engagement of the blocking element 36 in the blocking opening 26, in particular the engaging projections 220, 221, 320, 321, 23, 33 cannot be disengaged counter to the engaging direction Y, and therefore the positive lock between the closing parts 2, 3 is secured.

The blocking element 36 is arranged on the closing parts 3 in the immediate vicinity of the engaging device 32, and therefore the positive lock between the closing parts 2, 3 is secured where the positive-locking engagement exists. This improves the mechanical holding of the closing parts 2, 3 on each other.

As is apparent from the sequence from FIG. 4C to FIG. 6C, the contact elements 24, 34 slide over each other when the closing parts 2, 3 are brought into engagement with each other in the engaging direction Y. The contact elements 24, 34 thereby rub over one another, which can have the effect that the contact elements 24, 34 are freed from possible dirt or a possibly present oxide layer, and therefore reliable production of an electrical contact connection is promoted.

In the closed position, the contact elements 24, 34 are in contact with each other in an electrically contacting manner, as is apparent from FIG. 6C, and therefore a current can flow between the closing parts 2, 3.

FIGS. 7A-7D to 12A-12D and FIGS. 13A-13D to 17A-17D show the closing of the closing device 1 when the closing parts 2, 3 are attached obliquely to each other (wherein the direction of inclination of the closing part 3 in relation to the closing part 2 is reversed with respect to each other in the sequences of the figures).

If the closing part 3 is attached obliquely, as in FIGS. 7A-7D and 8A-8D, to the closing part 2, the engaging projections 23, 33 thus first of all enter into contact with each other and into engagement, as is apparent from FIG. 9C. By tilting of the closing part 3 in relation to the closing part 2, the engaging projections 220, 221, 320, 321 then also enter into contact and into engagement with one another, assisted by the magnetic interaction between the magnetic elements 250, 251, 350, 351, and therefore, in the closed position (FIGS. 12A-12D), the closing parts 2, 3 are in turn in engagement with each other in a positive locking manner.

Figure 16A:
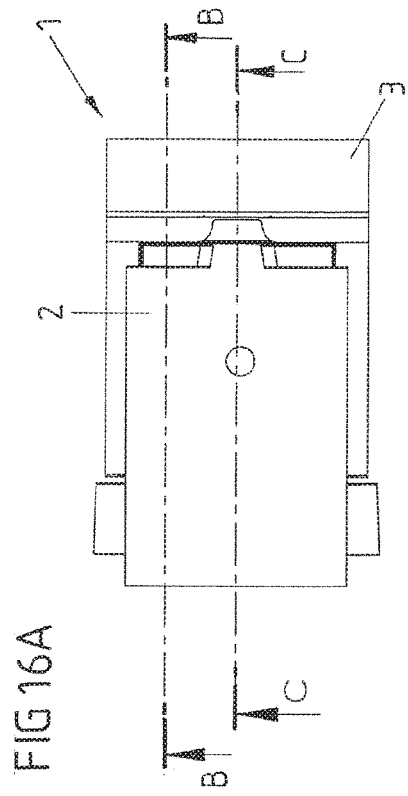
FIG. 16A shows a top view of the closing device during the further closing.
Figure 16D:
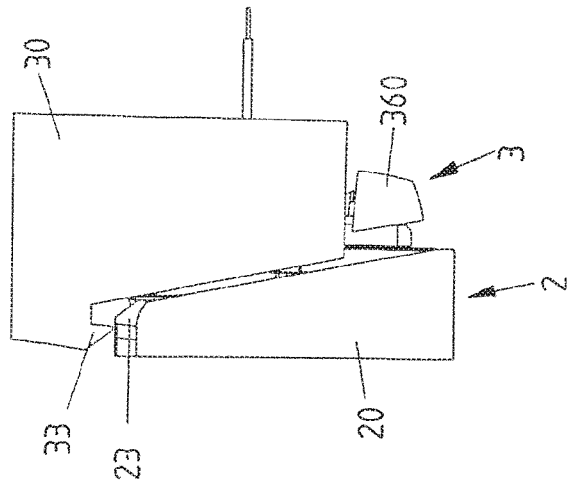
FIG. 16D shows a side view of the closing device.
Figure 16C:
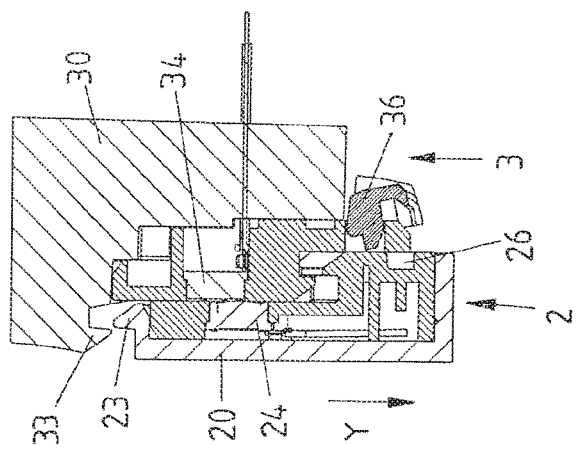
FIG. 16C shows a sectional view along the line B-B according to FIG. 16A.
Figure 16B:
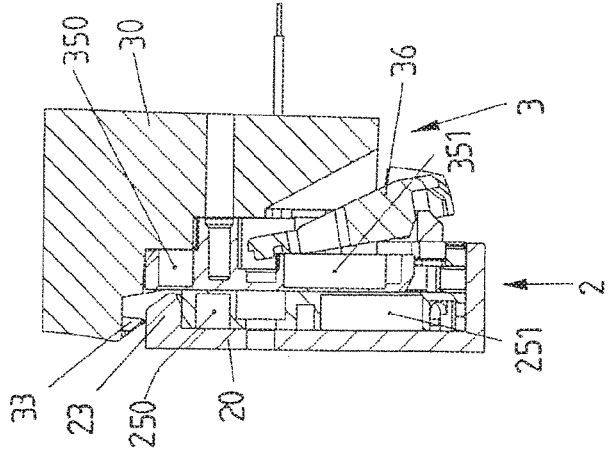
FIG. 16B shows a sectional view along the line C-C according to FIG. 16A.
Figure 20B:
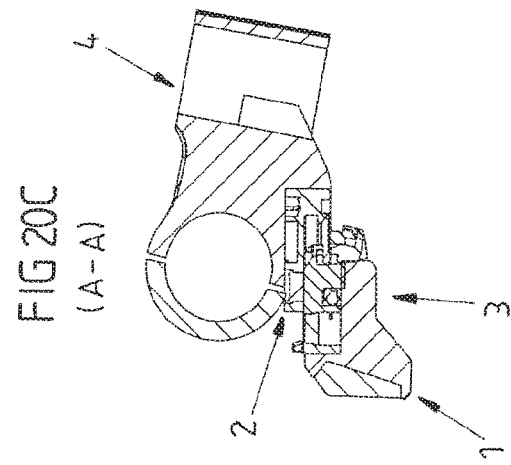
FIG. 20B shows a top view of the holder.
Figure 20C:
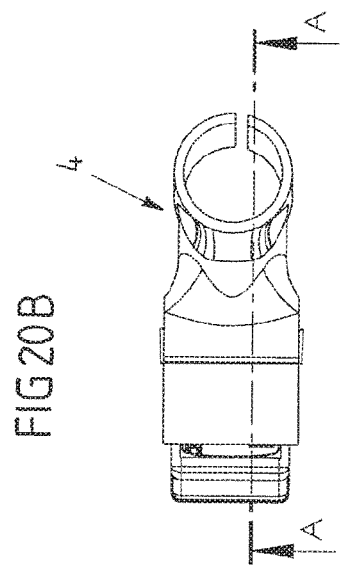
FIG. 20C shows a sectional view along the line A-A according to FIG. 20B.
Figure 20A:
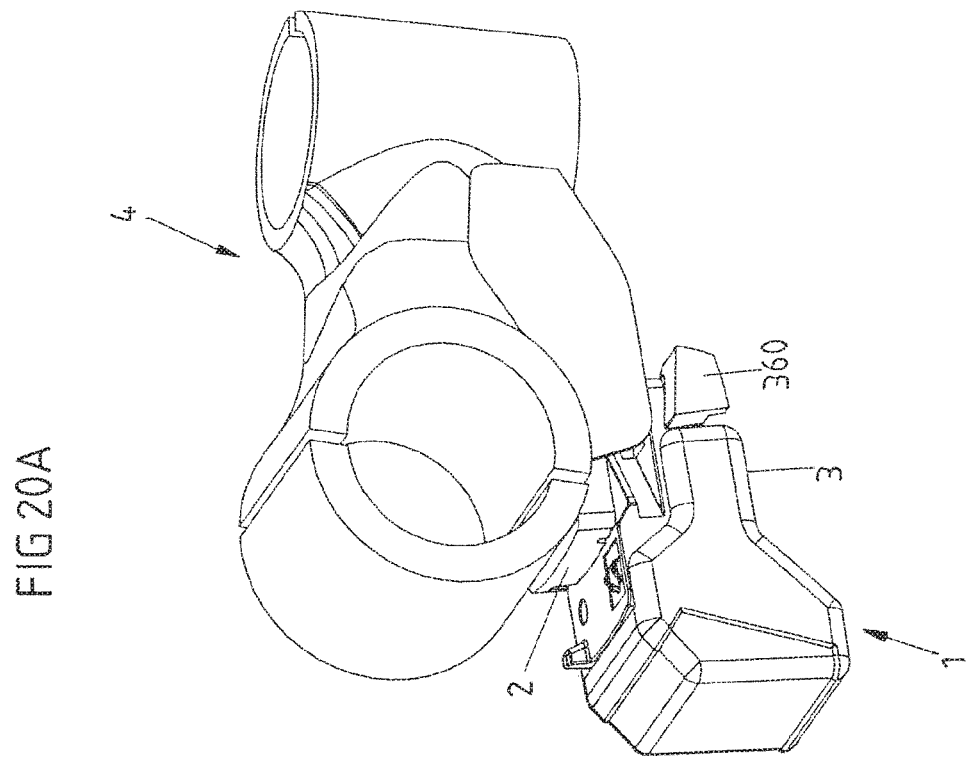
FIG. 20A shows a view of the closing device on the holder, during the further opening.
Figure 25D:
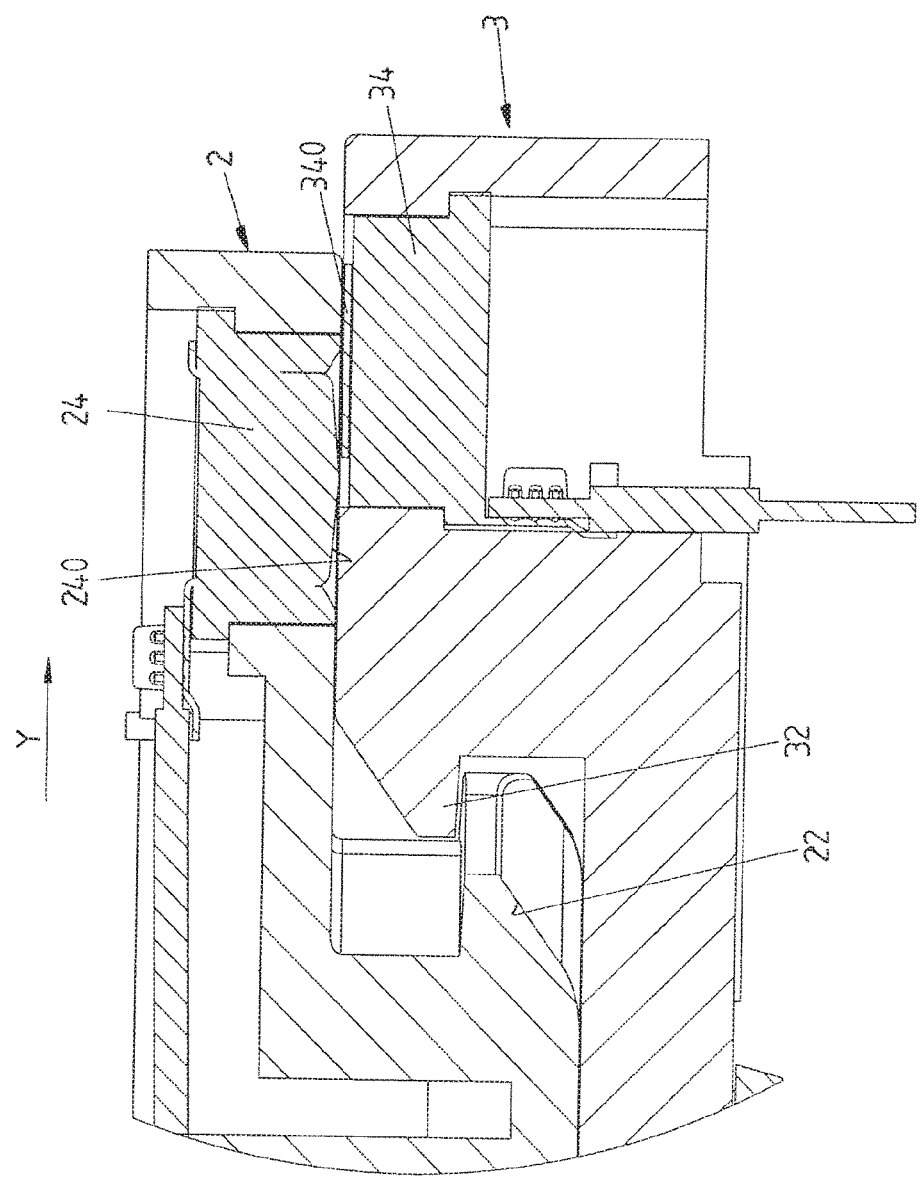
FIG. 25D shows an enlarged view of the detail B according to FIG. 25C.
Figure 25A:
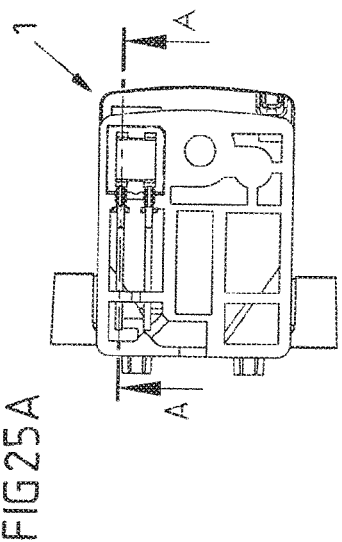
FIG. 25A shows a top view of the closing device during the further closing.
Figure 25B:
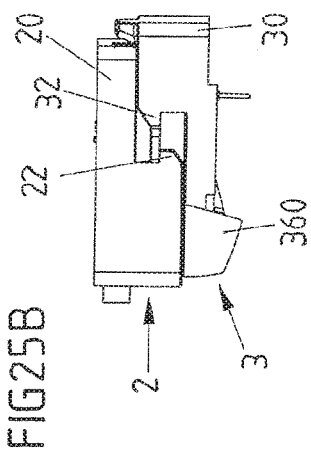
FIG. 25B shows a side view of the closing device.
Figure 25C:
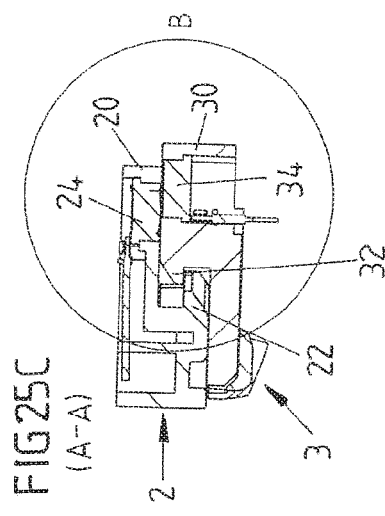
FIG. 25C shows a sectional view along the line A-A according to FIG. 25A.

During the oblique attachment, as in FIGS. 13A-13D and 14A-14D, first of all the engaging projections 220, 221, 320, 321 enter into contact with one another and, by tilting (FIG. 15C), the engaging projections 23, 33 are also moved toward each other and enter into engagement with each other, as is illustrated in FIGS. 16C and 17C.

The advantageous combination of the engaging projections 220, 221, 320, 321, which are arranged at an angle, of the blocking element 36 arranged in the vicinity of said engaging projections and of the rectilinear engaging projections 23, 33 has the effect that there is no erroneous position, that is to say that not through oversight does only one group of engaging projections engage and latch the blocking element in place. The engaging projections 220, 221, 320, 321 arranged at an angle can also be formed by functionally identical curved engaging projections.

Even when the closing parts 2, 3 are attached obliquely to each other, the contact elements 24, 34 in each case slide over each other when the engaging projections 220, 221, 320, 321, 23, 33 enter into engagement with one another and before the closed position is produced, as is apparent from FIGS. 11C and 16C. The connection of the closing parts 2, 3 is therefore produced in turn by rubbing of the contact elements 24, 34 over each other.

If the closure 1 is intended to be opened, the blocking element 36 can be moved out of its engagement with the blocking opening 26 via an actuating handle 360, and therefore the blocking between the closing parts 2, 3 is canceled and the closing parts 2, 3 can be released counter to the engaging direction Y from their positive locking engagement. By pushing the closing parts 2, 3 away from each other counter to the engaging direction Y (in an opening direction Z, see FIG. 2C), the closing parts 2, 3 can therefore be separated from each other in order to release the assemblies assigned to the closing parts 2, 3.

When the closing parts 2, 3 are attached to each other, a guide element 31 on the closing part 3 also enters into engagement with a guide opening 21 on the other closing part 2. This provides a linear guide of the closing parts 2, 3 on each other along the engaging direction Y such that, when the closing parts 2, 3 are attached to each other, the closing parts 2, 3 are guided with respect to each other along the engaging direction Y and are therefore secured with respect to each other in particular transversely with respect to the engaging direction Y.

Figure 33B:
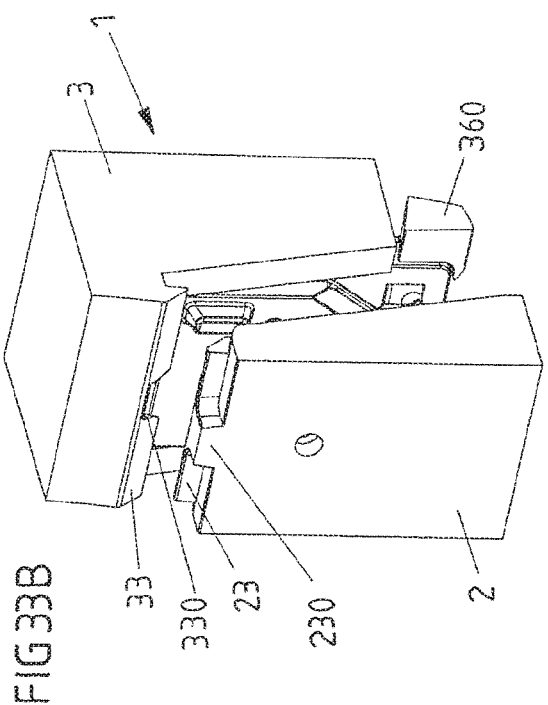
FIG. 33B shows another view of the closing device before the closing.

Below the engaging projection 23, an engaging element 230 is formed on the closing part 2, as is apparent, for example, from FIG. 31A and FIG. 33B. The engaging element 230 is assigned an engaging opening 330 on the engaging projection 33 of the other closing part 3 (see FIG.

Figure 34A:
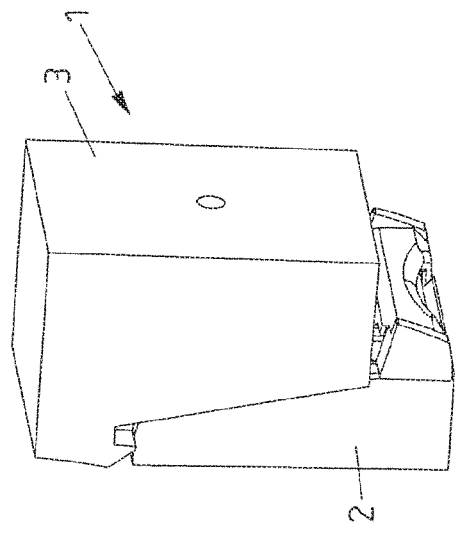
Figure 34B:
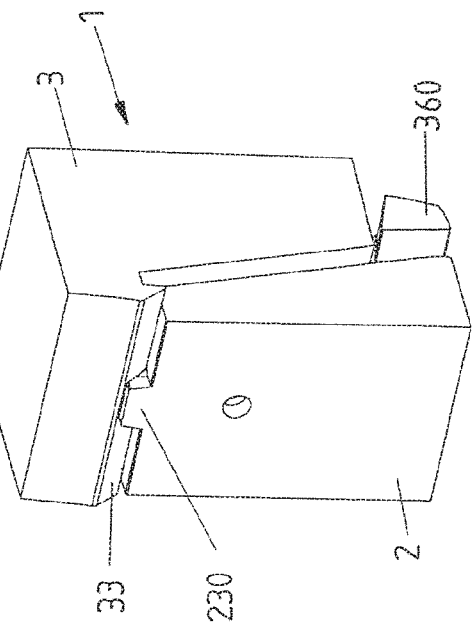

33B), and therefore, in the closed position of the closing device 1, illustrated in FIGS. 34A and 34B, the closing parts 2, 3 are additionally secured with respect to each other transversely with respect to the engaging direction Y via the engagement of the engaging element 230 in the engaging opening 330.

A closing device 1 of the described type can serve for connecting entirely random assemblies to one another. In the closed position of the closing device 1, the assemblies are mechanically fixedly interconnected, with a simultaneous electrical contact connection of the closing parts 2, 3 to each other, such that, for example, energy can be supplied/transmitted between the assemblies.

In an embodiment illustrated in FIGS. 18A-18C to 27A-27D, the closing device 1 serves for attaching a bicycle light to a bicycle and is accordingly assigned to a holder 4 which can connect, for example, a handlebar of a bicycle to a front wheel fork via fastening openings 40, 41.

In the embodiment illustrated, the closing part 2 is attached to the holder 4 while the other closing part 3 is assigned to the bicycle light. By the closing parts 2, 3 being attached to each other, the bicycle light can be attached to the holder 4 and therefore to the bicycle, with a simultaneous electrical contact connection, for example for the purpose of supplying electricity to the bicycle light.

If the bicycle light is intended to be released from the holder 4, the actuating handle 360 can be actuated in order thereby to cancel the position between the closing parts 2, 3 such that the bicycle light, as is illustrated in FIGS. 21A-21D, can be released from the holder 4.

In the embodiment according to FIGS. 18A-18C to 27A-27D, the closing parts 2, 3 do not have any further additional engaging projections 23, 33. Otherwise, this embodiment is functionally identical to the previously described embodiment, and therefore reference should be made to what has been stated above.

The sequence of FIGS. 22D to 27D illustrates, in enlarged sectional views, how, during the closing of the closing device 1, the electrical contact elements 24, 34 slide over each other in a rubbing manner in order to come into contact electrically with each other in the closed position (FIG. 27D). This applies identically for the exemplary embodiment according to FIGS. 18A-18C to 27A-27D as for the embodiment described above.

If the closing parts 2, 3 are attached to each other in the closing direction X, first of all the engaging projections of the engaging devices 22, 32 run onto each other, as is apparent from the sequence of FIG. 22D to FIG. 24D. As a result, the engaging projections of the engaging devices 22, 32 move past one another, with a slight offset of the closing parts 2, 3 relative to each other counter to the engaging direction Y.

As the closing parts 2, 3 approach each other in the closing direction X, the contact element 24 of the closing part 2 acts on a contact spring 340, which protrudes from the contact element 34, and stresses said contact spring, as is apparent in the transition from FIG. 24D to FIG. 25D. If the closing parts 2, 3 now move in the engaging direction Y into positive locking engagement with each other, the contact elements 24, 34 slide over each other in a rubbing manner, in particular with mechanically stressed contact of the contact spring 340 against a surface 240 of the contact element 24.

By rubbing of the contact elements 24, 34 against each other, dirt can be eliminated and an oxide layer which could have formed on the contact elements 24, 34 may be scrapped off, and therefore, in the closed position (FIG. 27D), there is a reliable electrical contact connection between the contact elements 24, 34.

The closing device 1 can also serve for connecting other assemblies of a bicycle, for example also for connecting a rear light 6 to a bicycle frame 50 of a bicycle 5, as is illustrated in FIGS. 28A-28D to 30A-30D. The closing device 1 serves in turn for producing a mechanical holding of the rear light 6 on the bicycle frame 50 and also for the electrical contact connection.

For the functional configuration and for the manner of operation during the closing and opening of the closing device 1, for the embodiments according to FIGS. 18A-18C to 27A-27D and FIGS. 28A-28D to 30A-30D reference should be made in full to the explanations regarding the exemplary embodiment described first.

The concept on which the solution is based is not restricted to the embodiments described above, but can basically also be realized in entirely different embodiments.

A closing device can be formed in particular also without electrical contacts and can therefore serve for the purely mechanical-magnetic interconnection of two assemblies.

A closing device—with or without electrical contact elements—can be used for connecting assemblies to a bicycle, but can also serve for interconnecting any other assemblies.

LIST OF REFERENCE SIGNS

1 Closing device
2 Closing part
20 Basic body
200, 201 Partial body
21 Guide opening
22 Engaging device
220, 221 Engaging projection
222 Run-on slope
23 Engaging device
230 Engaging element
24 Electrical contact
240 Surface
25 Magnetic device
250, 251 Magnetic element
26 Blocking opening
3 Closing part
30 Basic body
300, 301 Component
31 Guide element
310 Opening
32 Engaging device
320, 321 Engaging projection
322 Run-on slope
33 Engaging device
330 Engaging opening
34 Electrical contact
340 Spring element
35 Magnetic device
350, 351 Magnetic elements
36 Blocking element
360 Actuating handle
361 Pivot axis
37 Spring element
4 Holder
40, 41 Fastening opening
5 Bicycle
50 Bicycle frame
6 Light
X Closing direction Y Engaging direction
Z Opening direction

The invention claimed is:

1. A closing device for releasably connecting two parts, comprising
    a first closing part comprising a first engaging projection,
    a second closing part comprising a second engaging projection, wherein the first closing part and the second closing part can be attached to each other in order to close the closing device and, in a closed position, are interconnected mechanically by the first engaging projection and the second engaging projection being in engagement with each other in a positive locking manner in the closed position,
    a magnetic device which acts between the first closing part and the second closing part and is designed to assist the attaching of the first closing part and the second closing part to each other by providing a magnetic attraction force, and
    a blocking element which is arranged on one of the closing parts and, when the closing parts are attached to each other, is deflectable out of a basic position on the associated closing part in such a manner that the first engaging projection and the second engaging projection can be brought into engagement with each other in order to close the closing device,
    wherein the first closing part has at least one first electrical contact element and the second closing part has at least one second electrical contact element, wherein, in the closed position, the at least one first electrical contact element and the at least one second electrical contact element are operatively connected to one another in an electrically contacting manner,
    wherein the blocking element is configured to move back into its basic position during or after establishing the engagement in order to, in the closed position, block the positive locking engagement of the first engaging projection and the second engaging projection with each other, and
    wherein the first closing part comprises a first base body and the second closing part comprises a second base body, the first engaging projection being formed rigidly on the first base body and the second engaging projection being formed rigidly on the second base body.

2. The closing device as claimed in claim 1, wherein the blocking element is arranged pivotably on the associated closing part, wherein, in the closed position, the blocking element engages in a blocking manner in an engaging opening on the other closing part.

3. The closing device as claimed in claim 1, wherein one of the closing parts has a guide element which, when the closing parts are attached, engages in a guide opening in the other of the closing parts in order to guide the attaching movement of the closing parts to each other.

4. The closing device as claimed in claim 1, wherein the first closing part and the second closing part each have at least one magnetic element which together form the magnetic device and interact in a magnetically attracting manner during the closing of the closing device.

5. The closing device as claimed in claim 4, wherein the at least one magnetic element of the first closing part and the at least one magnetic element of the second closing part are designed to interact, when the first closing part and the second closing part are attached to each other, in such a manner that a component of the magnetic attraction force acts in an engaging direction in which the first engaging projection and the second engaging projection can be brought into engagement with each other.

6. The closing device as claimed in claim 1, wherein two first engaging projections are arranged on the first closing part and two second engaging projections are arranged on the second closing part, wherein the first engaging projections forming a first engaging device and the second engaging projections forming a second engaging device each extend at an angle to one another.

7. The closing device as claimed in claim 6, wherein the first engaging projections and the second engaging projections are each extended obliquely with respect to an engaging direction in which the engaging devices can be brought into engagement with each other.

8. The closing device as claimed in claim 6, wherein the first closing part has an additional engaging projection to the first engaging device and the second closing part has an additional engaging projection to the second engaging device, wherein the additional engaging projection to the first engaging device is offset along the engaging direction with respect to the first engaging projections and the additional engaging projection to the second engaging device is offset along the engaging direction with respect to the second engaging projections.

9. A closing device for releasably connecting two parts, comprising
    a first closing part comprising a first engaging projection,
    a second closing part comprising a second engaging projection, wherein the first closing part and the second closing part can be attached to each other in order to close the closing device and, in a closed position, are interconnected mechanically by the first engaging projection and the second engaging projection being in engagement with each other in a positive locking manner in the closed position, and
    a magnetic device which acts between the first closing part and the second closing part and is designed to assist the attaching of the first closing part and the second closing part to each other by providing a magnetic attraction force,
    wherein the first closing part has at least one first electrical contact element and the second closing part has at least one second electrical contact element, wherein, in the closed position, the at least one first electrical contact element and the at least one second electrical contact element are operatively connected to one another in an electrically contacting manner,
    wherein at least one of the electrical contact elements has a contact spring which is elastically deformable when the closing parts are attached to each other, and when the closing parts are attached to each other and/or when the closing parts are released from each other, the at least one first electrical contact element and the at least one second electrical contact element slide tangentially on one another by means of surfaces.

10. A closing device for releasably connecting two parts, comprising
    a first closing part comprising two engaging projections forming a first engaging device,
    a second closing part comprising two second engaging projections forming a second engaging device, wherein the first closing part and the second closing part can be attached to each other in order to close the closing device by bringing the first engaging projections and the second engaging projections, in an engaging direction, into engagement with each other in a positive locking manner such that, in a closed position in which the first engaging projections and the second engaging projections are in engagement with each other in a positive locking manner, the first closing part and the second closing part are mechanically connected to each other, and a magnetic device which acts between the first closing part and the second closing part and is designed to assist the attaching of the first closing part and the second closing part to each other by providing a magnetic attraction force, wherein the first closing part has an additional engaging projection to the first engaging device and the second closing part has an additional engaging projection to the second engaging device, wherein the additional engaging projection to the first engaging device is offset along the engaging direction with respect to the first engaging device and the additional engaging projection to the second engaging device is offset along the engaging direction with respect to the second engaging device, wherein the first engaging projections extend at an angle to one another forming the first engaging device and the second engaging projections extend at an angle to one another forming the second engaging device, and wherein the additional engaging projection to the first engaging device and the additional engaging projection to the second engaging device each extend transversely with respect to the engaging direction.

11. The closing device as claimed in claim 10, wherein the first engaging projections and the second engaging projections are each extended obliquely with respect to an engaging direction in which the engaging devices can be brought into engagement with each other.

12. The closing device as claimed in claim 10, wherein the first closing part has at least one first electrical contact element and the second closing part has at least one second electrical contact element, wherein, in the closed position, the at least one first electrical contact element and the at least one second electrical contact element are operatively connected to one another in an electrically contacting manner.

13. The closing device as claimed in claim 10, wherein the first closing part and the second closing part each have at least one magnetic element which together realize the magnetic device and interact in a magnetically attracting manner during the closing of the closing device.

14. The closing device as claimed in claim 10, wherein at least one of the closing parts has a guide element which, when the closing parts are attached, engages in a guide opening in the other of the closing parts in order to guide the attaching movement of the closing parts to each other, and the first closing part and/or the second closing part have/has a base body which is composed of two partial bodies of different materials.

15. The closing device as claimed in claim 10, further comprising a blocking element which is arranged on one of the closing parts and, when the closing parts are attached to each other, is deflectable out of a basic position on the associated closing part in such a manner that the first engaging projections and the second engaging projections can be brought into engagement with each other in order to close the closing device.

16. The closing device as claimed in claim 15, wherein the blocking element is designed to move back into its basic position during or after production of the engagement in order, in the closed position, to block the positive locking engagement of the first engaging projections and the second engaging projections with each other.

* * * * *